(12) United States Patent
Takamune

(10) Patent No.: US 8,099,675 B2
(45) Date of Patent: Jan. 17, 2012

(54) APPARATUS FOR PROVIDING INDICATION OF AUDIO COPY PROTECTION SUPPORT

(75) Inventor: Akira Takamune, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 986 days.

(21) Appl. No.: 12/043,234

(22) Filed: Mar. 6, 2008

(65) Prior Publication Data

US 2008/0222551 A1 Sep. 11, 2008

(30) Foreign Application Priority Data

Mar. 9, 2007 (JP) ................. P2007-060819

(51) Int. Cl.
*G06F 3/048* (2006.01)
(52) U.S. Cl. ......... 715/772; 715/846; 715/864; 715/977
(58) Field of Classification Search .............. 715/772
See application file for complete search history.

(56) References Cited

U.S. PATENT DOCUMENTS

| 7,840,631 | B2* | 11/2010 | Farcasiu | 709/200 |
| 2006/0229016 | A1* | 10/2006 | Jang et al. | 455/41.2 |
| 2007/0078981 | A1* | 4/2007 | Alberth et al. | 709/225 |
| 2008/0288519 | A1* | 11/2008 | Stoyanov et al. | 707/101 |
| 2009/0073870 | A1* | 3/2009 | Haartsen et al. | 370/216 |
| 2009/0091655 | A1* | 4/2009 | Russell et al. | 348/515 |
| 2009/0249247 | A1* | 10/2009 | Tseng et al. | 715/808 |

FOREIGN PATENT DOCUMENTS

JP 2006-319572 A 11/2006

OTHER PUBLICATIONS

MobileIsGood, "Bluetooth," Jan. 8, 2007, Available http://replay.waybackmachine.org/20070108213119/http://www.mobileisgood.com/WhatIsBluethooth.php.*

* cited by examiner

*Primary Examiner* — Alvin Tan
(74) *Attorney, Agent, or Firm* — Holtz, Holtz, Goodman & Chick, PC

(57) ABSTRACT

According to an aspect of the invention, there is provided an information processing apparatus including: a transmission unit configured to transmit an information acquiring request which acquires first information indicating whether or not a predetermined standard for limiting copy of audio data is supported by a terminal device to which the audio data is transferred; a judgment unit configured to judge whether or not the terminal device supports the predetermined standard, based on the first information included in information acquiring response to the information acquiring request from the terminal device; a display unit configured to display an icon indicating that the information processing apparatus is connected to the terminal device via the wireless communication; and a control unit to control, based on a judgment result by the judgment unit, a change of display of the icon.

9 Claims, 16 Drawing Sheets

| BLUETOOTH PICT | | |
|---|---|---|
| 51 | | CONNECTION STANDBY PICT |
| | | DISPLAY IN BLUETOOTH-CONNECTABLE STATE WITH OPPOSITE DEVICE |
| 52 | | CONNECTION PICT |
| | | DISPLAY IN STATE WHERE CONNECTION WITH OPPOSITE DEVICE IS ESTABLISHED |
| 53 | | SCMS-T CONNECTION PICT |
| | | DISPLAY IN STATE WHERE CONNECTION WITH OPPOSITE DEVICE IS ESTABLISHED AND COPY PROTECTION OF OPPOSITE DEVICE IS EFFECTIVE |
| 54 | | LINK LOSS PICT |
| | | DISPLAY IN STATE WHERE CONNECTION WITH OPPOSITE DEVICE IS LOSS AUTOMATIC CONNECTION IF THERE IS CONNECTION FROM OPPOSITE DEVICE DURING LINK LOSS |

FIG. 6

| BLUETOOTH PICT | |
|---|---|
|  | CONNECTION STANDBY PICT |
| | DISPLAY IN BLUETOOTH-CONNECTABLE STATE WITH OPPOSITE DEVICE |
|  | CONNECTION PICT |
| | DISPLAY IN STATE WHERE CONNECTION WITH OPPOSITE DEVICE IS ESTABLISHED |
|  | SCMS-T CONNECTION PICT |
| | DISPLAY IN STATE WHERE CONNECTION WITH OPPOSITE DEVICE IS ESTABLISHED AND COPY PROTECTION OF OPPOSITE DEVICE IS EFFECTIVE |
|  | LINK LOSS PICT |
| | DISPLAY IN STATE WHERE CONNECTION WITH OPPOSITE DEVICE IS LOSS<br>AUTOMATIC CONNECTION IF THERE IS CONNECTION FROM OPPOSITE DEVICE DURING LINK LOSS |

51, 52, 53, 54

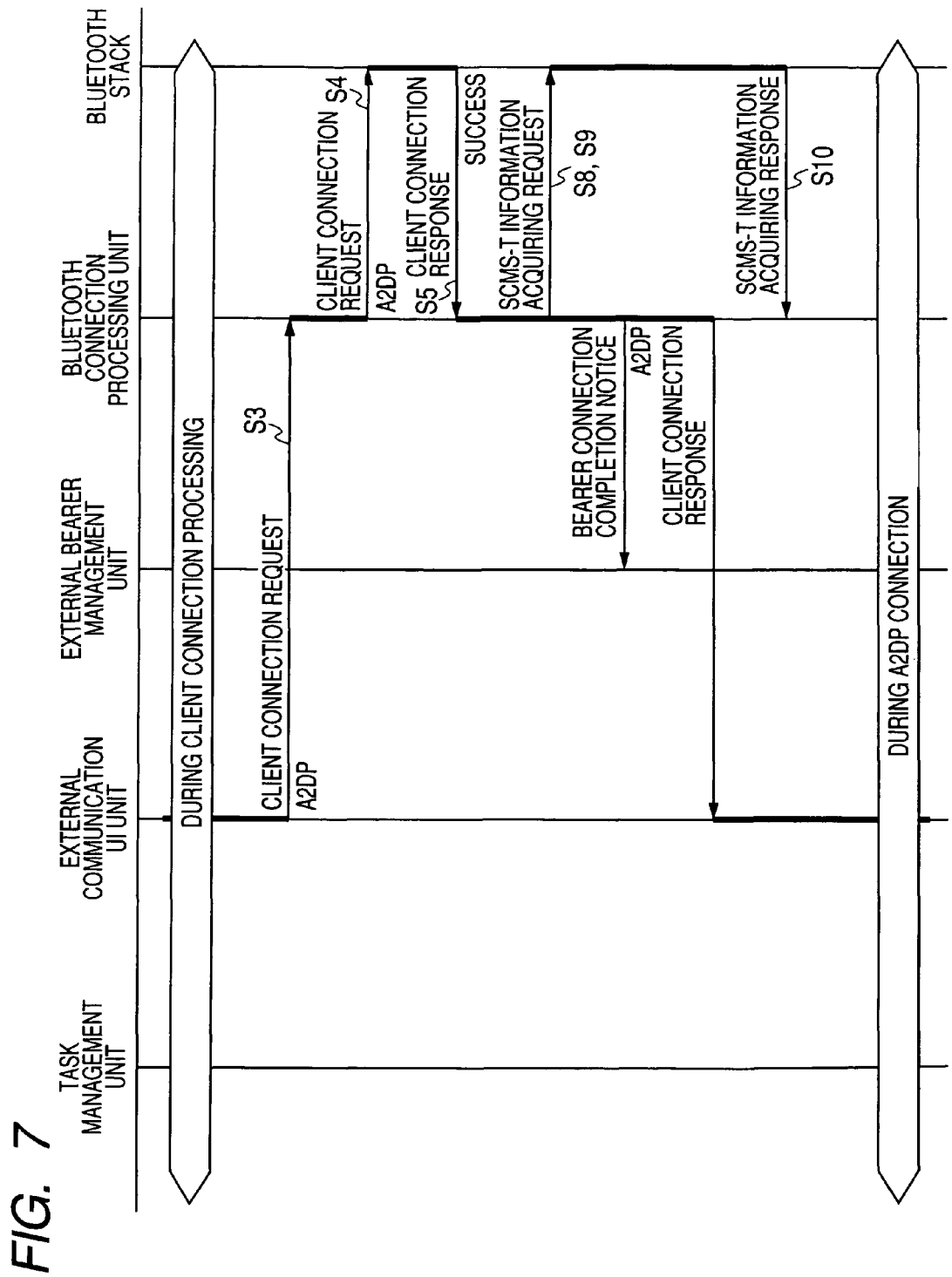

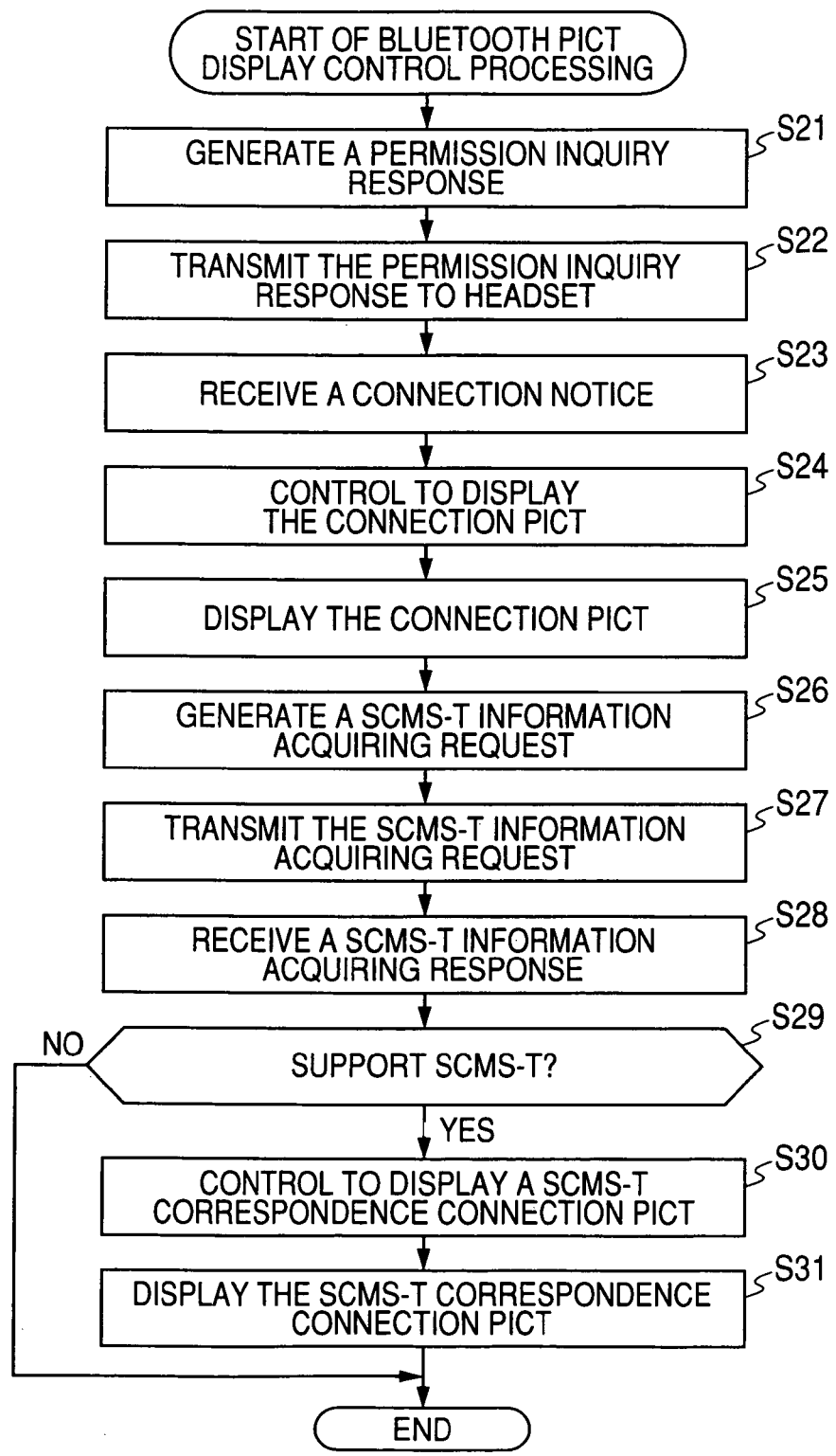

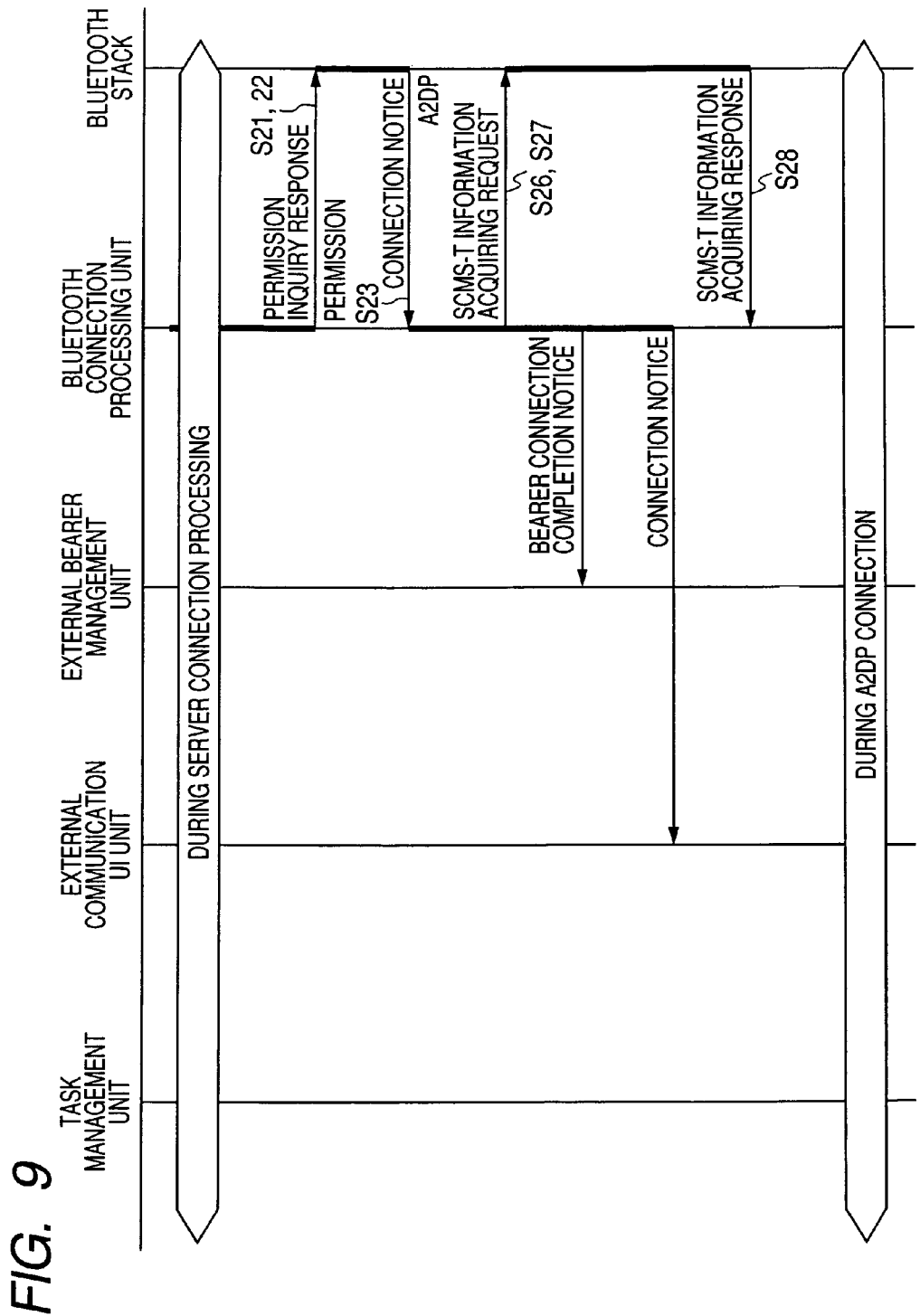

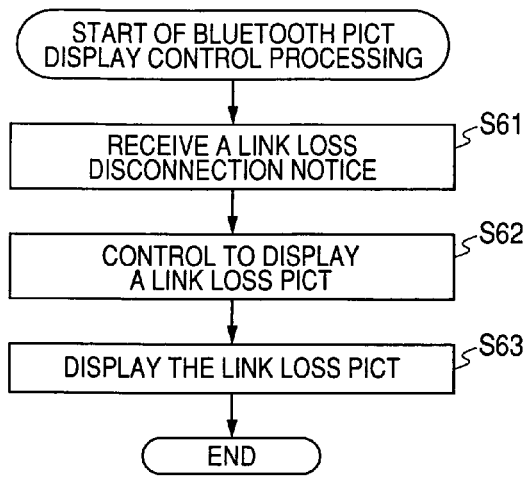
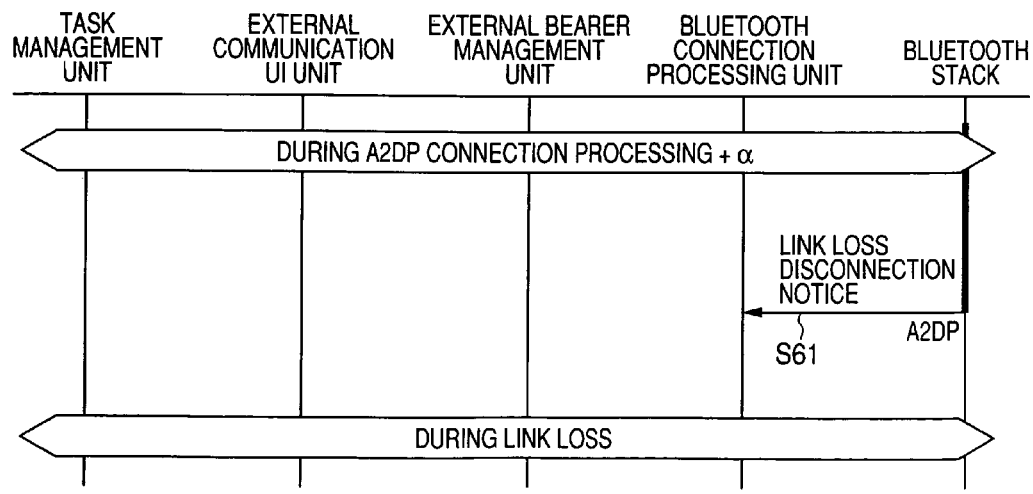

APPARATUS FOR PROVIDING INDICATION OF AUDIO COPY PROTECTION SUPPORT

CROSS-REFERENCE TO RELATED APPLICATIONS

This application is based on and claims the benefit of priority from the prior Japanese Patent Application No. 2007-060819, filed on Mar. 9, 2007; the entire contents of which are incorporated herein by reference.

TECHNICAL FIELD

The present invention relates to an information processing apparatus which can transfer audio data.

BACKGROUND

Recently, communication technology, and particularly wireless communication technology are developed. By using the wireless communication technology, codeless communication between an electronic device and a terminal can be established, whereby connecting between the electronic device and the terminal is simplified, and the location of the electronic device or the terminal is not limited. Therefore, the wireless communication technology becomes higher in convenience than wire communication technology.

For example, as wireless communication technology applicable to an electronic device, Bluetooth (registered trademark) has been known. By using the wireless communication technology of this Bluetooth, audio data can be transferred from a portable terminal such as a mobile telephone device or from a portable music player without using an audio cable to a terminal device such as a headset.

As transmission profiles of audio data, for example, "Advanced Audio Distribution Profile (A2DP)" (Advanced Audio/Video Distribution Profile (Bluetooth SIG)) and "Generic Advanced Audio/Video Distribution Profile" (Generic Advanced Audio/Video Distribution Profile (Blue-tooth SIG)) have been known. These are standards for performing streaming transfer of audio data between Bluetooth-connected devices in real time.

For example, in a portable information terminal such as a mobile telephone device or in a portable music player, audio data is compressed by a format of SBC (Sub Band Coding), MP3 (MPEG1 Audio Layer-3), or ATRAC (Advanced Transform Acoustic Coding) 3 and transferred by packet unit. On the other hand, in a terminal device such as a speaker or a headset, without waiting reception of all the packets, simultaneously with reception of data, its data is reproduced. Hereby, a user can listen to sound from the portable information terminal or the portable music player in substantially real time through the terminal device such as the speaker or the headset.

Further, the following technology is also proposed: in case that incoming sound call interrupts transmission of audio data to the terminal device such as a headset, the transmission of the audio data to the terminal device is stopped and audio data regarding the incoming sound is transmitted to the terminal device (refer to, for example JP-A-2006-319572).

SUMMARY

Recently, as technology for preventing copy of digital contents such as audio data, SCMS (Serial Copy Management System)-T has been proposed. This SCMS-T is one of systems used for protection of digital contents described in "A2DP Sepc V1. 0 sec. 11 Appendix A: Audio Streaming with Content Protection". From a viewpoint of copyright protection, in order to prevent the audio data transmitted by the A2DP from being stored directly in a device or from being output to another device, the SCNS-T intimates its intension for the prevention to the terminal device (device) such as the headset. In this intimation of the intension, 2-bits (CP-bit and L-bit) used in copy control in the SCMS-T are inserted in a packet format as a CP (Content Protection) header, whereby the 2-bits (CP-bit and L-bit) are transmitted to the terminal device (device) such as the headset.

Hereby, in the terminal device (device) such as the headset in which the SCMS-T has not been supported, reproduction of the transmitted audio data is not permitted and the transmitted audio data is not reproduced. Namely, in only the terminal device (device) such as the headset in which the SCMS-T has been supported, the reproduction of the transmitted audio data is permitted and the transmitted audio data is reproduced.

Also in case that audio data of terrestrial digital broadcasting is transferred by the A2DP from a mobile telephone device to a headset, similarly, only in the terminal device (device) such as the headset in which the SCMS-T has been supported, the reproduction of the transmitted audio data is permitted and the transmitted audio data is reproduced.

However, when the audio data of terrestrial digital broadcasting is transferred by the A2DP from the mobile telephone device to the headset, even in case that the SCMS-T has not been supported in the terminal device (device) such as the headset, the connection between the mobile telephone device and the terminal device by the A2DP is possible. Thus, though the mobile telephone device and the terminal device are connected by the A2DP, a condition that the transmitted audio data is not reproduced can occur.

Conventionally, in case that the Bluetooth is used, three states of the Bluetooth including a setting ON-state (regular standby state), a state during connection (link), and a state during link loss are indicated with PICT or an icon, whereby the user is notified of its present state. However, since the user is not notified of the condition that the transmitted audio data is not reproduced because the SCMS-T has not been supported in the terminal device (device) such as the headset, there is a problem that he cannot know why the transmitted audio data is not reproduced and cannot find the condition that the transmitted audio data is not reproduced. Such the case can lead to user's claim.

According to an aspect of the invention, there is provided an information processing apparatus including: a transmission unit configured to transmit an information acquiring request which acquires first information indicating whether or not a predetermined standard for limiting copy of audio data is supported by a terminal device to which the audio data is transferred; a judgment unit configured to judge whether or not the terminal device supports the predetermined standard, based on the first information included in information acquiring response to the information acquiring request from the terminal device; a display unit configured to display an icon indicating that the information processing apparatus is connected to the terminal device via the wireless communication; and a control unit to control, based on a judgment result by the judgment unit, a change of display of the icon.

BRIEF DESCRIPTION OF THE DRAWINGS

In the accompanying drawings:

FIG. 6 is a diagram showing an example of Bluetooth PICT displayed on a liquid crystal display;

FIG. 7 is a diagram showing a sequence of the concrete processing in CPU of a main control unit when Bluetooth PICT display control processing described with reference to the flowchart in FIG. 5 is executed;

FIG. 8 is a flowchart for explaining another Bluetooth PICT display control processing in the mobile telephone device of FIG. 4;

FIG. 9 is a diagram showing a sequence of the concrete processing in CPU of the main control unit when Bluetooth PICT display control processing described with reference to the flowchart in FIG. 8 is executed;

FIG. 14 is a flowchart for explaining another Bluetooth PICT display control processing in the mobile telephone device of FIG. 4;

FIG. 15 is a diagram showing a sequence of the concrete processing in CPU of the main control unit when Bluetooth PICT display control processing described with reference to the flowchart in FIG. 14 is executed;

DESCRIPTION OF THE EMBODIMENTS

Figure 1:
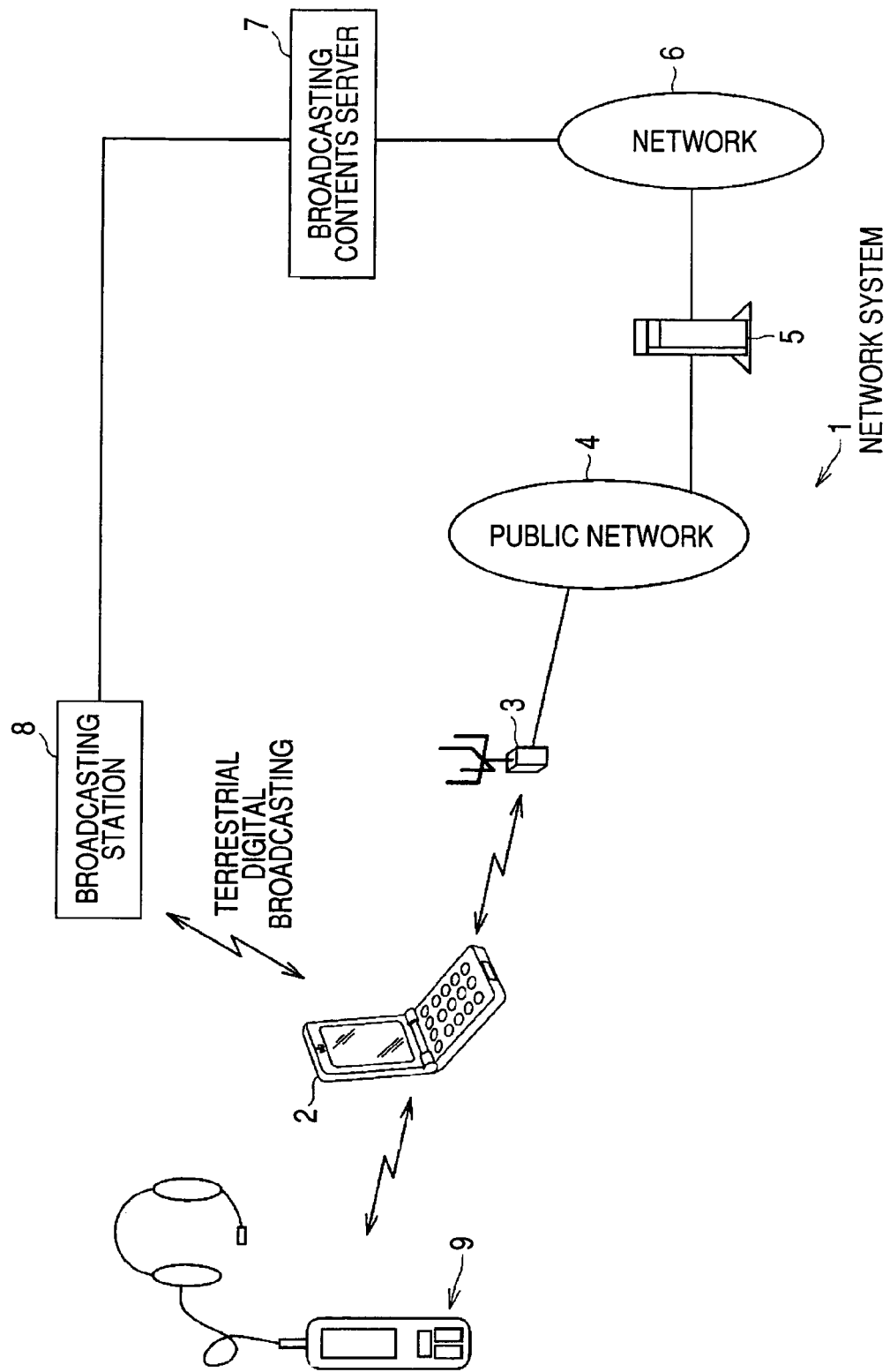
FIG. 1 is a diagram showing the schematic configuration of a network system according an embodiment of the invention.

Embodiments of the invention will be described below with reference to drawings. FIG. 1 shows the entire configuration of a network system 1 according to an embodiment of the invention. As shown in FIG. 1, in the network system 1, a broadcasting station 8 is installed at a predetermined location, and this broadcasting station 8 transmits, in a predetermined range, One-Seg (One-Segment) terrestrial digital broadcasting and terrestrial digital broadcasting. A mobile telephone device 2 applicable to an information processing apparatus receives, through a built-in terrestrial digital receiver (for example, a terrestrial digital receiver 49 in FIG. 4), the terrestrial digital broadcasting from this broadcasting station 8.

Further, in the network system 1, a base station 3 that is a fixed wireless station is installed, to which the mobile telephone device 2 that is a mobile wireless station is wireless-connected by, for example, a code-division multiple access system called W-CDMA (Wideband-Code Division Multiple Access).

Further, the base station 3 is connected through a wire line to a public network 4, and an access server 5 of an Internet service provider is connected to the public network 4. To the access server 5, a broadcasting contents server 7 is connected through a network 6 (including, for example, the Internet, LAN (Local Area Network), WAN (Wide Area Network), and other various networks).

In the vicinity of the mobile telephone device 2, there is disposed a headset 9 applicable as a terminal device. The headset 9 receives audio data (including also audio data of Terrestrial digital broadcasting) transferred from the mobile telephone device by means of wireless communication, and can reproduce the audio data in real time.

Figure 2A:
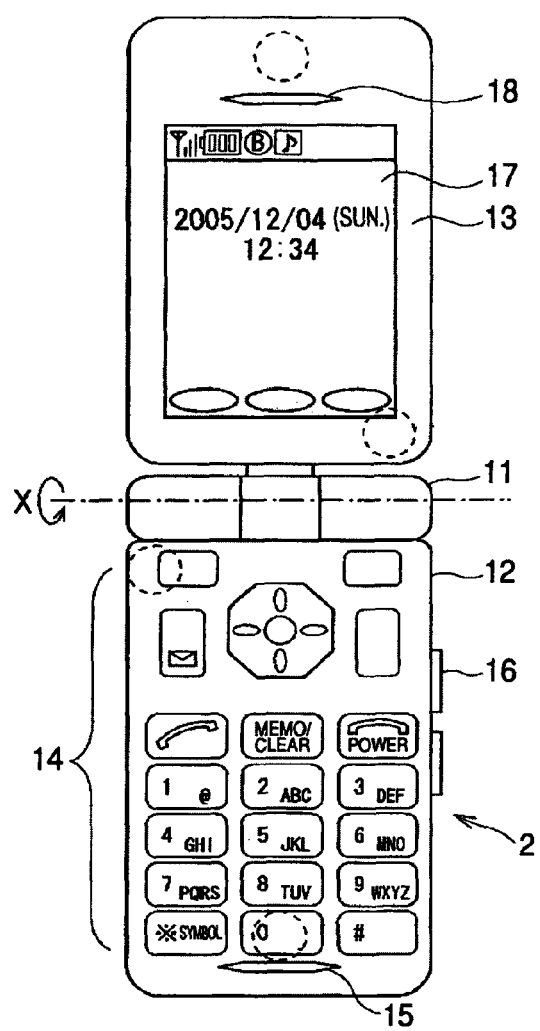
FIGS. 2(A), 2(B) are external views showing the external constitution of a mobile telephone device according to the embodiment.
Figure 2B:
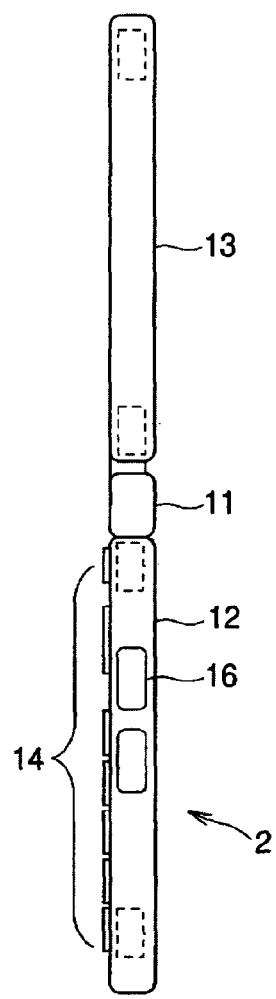

FIGS. 2(A), 2(B) show the external constitution of the mobile telephone device 2 according to the embodiment. FIG. 2(A) shows the external constitution of the mobile telephone device 2 viewed from a front side when the mobile telephone device 2 is opened at an angle of about 180°, and FIG. 2(A) shows the external constitution of the mobile telephone device 2 viewed from a side surface when the mobile telephone device 2 is opened.

As shown in FIGS. 2(A) and 2(B), the mobile telephone device 2 includes a first housing 12 and a second housing 13, which are coupled to each other by a hinge part 11 located in the center of them. The mobile telephone device 2 is formed so as to be foldable through the hinge part 11 in a direction of X. In a predetermined position inside the mobile telephone device 2, an antenna for transmission and reception (antenna 44 in FIG. 4 described later) is provided, and the mobile telephone device 2 transmits and receives radio waves between the telephone 2 and the base station 3 through the built-in antenna.

The first housing 12 has, on its surface, an operation key 14 including numeral keys from "0" to "9", a call key, a redial key, an end/ON-OFF key, a clear key, an e-mail key, and the like. Using the operation key 14, various instructions can be input.

At the upper portion of the first housing 12, a cross-shaped key and a decision key are provided as the operation key. The user operates the cross-shaped key in the up-down and left-right directions, whereby a cursor can be moved in the up-down and left-right directions. Specifically, by the operation of the cross-shaped key, various operations are executed, such as a scroll operation of a phone book list or e-mail, a page turning-over operation of simple home pages and an image feeding operation.

Further, by pressing the decision key, various functions can be decided. For example, when the user selects a desired telephone number from plural telephone numbers in the phone book list displayed on a liquid crystal display 17 by operating the cross-shaped key, and presses the decision key in an interior direction of the first housing 12, the first housing 12 decides the selected telephone number and performs call processing for the selected telephone number.

The first housing 12 further includes an e-mail key adjacent to the left of the cross-shaped key and the decision key. When the e-mail key is pressed in the internal direction of the first housing 12, a mail transmitting and receiving function can be called. Adjacently to the right of the cross-shaped key and the decision key, a browser key is provided. When the browser key is pressed in the internal direction of the first housing 12, data on a Web page can be browsed. Further, the e-mail key and the browser key provided adjacently to the right and the left of the cross-shaped key and the decision key can have various functions such as "YES" and "NO" on a screen displayed in the liquid crystal display 17. Therefore, they are referred to respectively as a soft 1 key and a soft 2 key.

Further, the first housing 12 includes a microphone 15 at the lower portion of the operation key 14, and the microphone 15 collects user's voice in the speaking time. The first housing 12 further includes a side key 16 for operation of the mobile telephone device 2.

Further, to the back side of the first housing 12, a not-shown battery pack is attached by insertion. When the end/ON-OFF key is in an ON-state, power is supplied from the battery pack to each circuit and the operational state starts.

On the other hand, the second housing 13 has, on its front surface, the liquid crystal display 17 (main display), which can display a receiving state of radio wave, residual amount of battery, names with phone numbers saved on the phone book, transmission history, contents of e-mail, a simple homepage, an image picked-up by a CCD (Charge Coupled Device) camera (CCD camera 20 in FIG. 3(A) described later), contents received from an external contents server (not shown), and contents stored in a memory card (memory card 46 in FIG. 4 described later).

Further, in a predetermined position of the upper portion of the liquid crystal display 17, a speaker 18 is provided, through which the user can speak over the telephone.

Figure 3A:
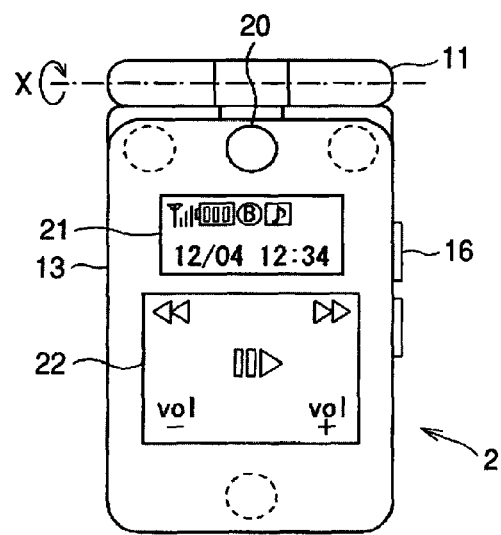
FIGS. 3(A), 3(B) are external views showing another external constitution of the mobile telephone device according to the embodiment.
Figure 3B:
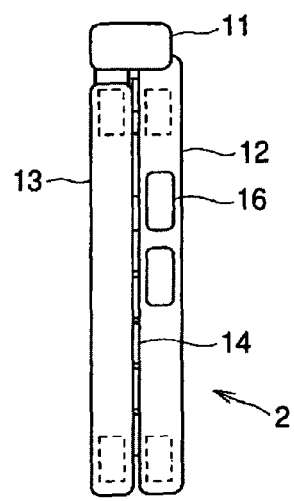

FIGS. 3(A), 3(B) show another external constitution of the mobile telephone device 2 according to the embodiment. The mobile telephone device 2 in FIG. 3(A) is in a state when the mobile telephone device 2 in the state in FIG. 2(A) is moved rotationally in the X-direction. FIG. 3(A) shows the external constitution of the mobile telephone device 2 viewed from a front side when the mobile telephone device 2 is closed, and FIG. 3(A) shows the external constitution of the mobile telephone device 2 viewed from a side surface when the mobile telephone device 2 is closed.

At the upper portion of the second housing 13, a CCD camera 20 is provided, by which a desired pick-up object can be picked up. Below the CCD camera 20, a sub-display 21 is provided, on which an antenna PICT that indicates a level of the present antenna sensitivity, a battery PICT that indicates the present residual amount of the battery of the mobile telephone device 2, the present time, and the like are displayed.

Below the sub-display 21, an electrostatic touch pad 22 is further provided. Though the electrostatic touch pad 22 is seemingly one sheet of touch pad, not-shown sensors are provided in plural portions of the touch pad 22. Therefore, when the user touches the vicinity of the sensor, the sensor detects its touch, and a rewind function, a fast-forward function, a sound level down operation, a sound level up operation, a reproduction operation, or a temporary stop operation is executed.

Figure 4:
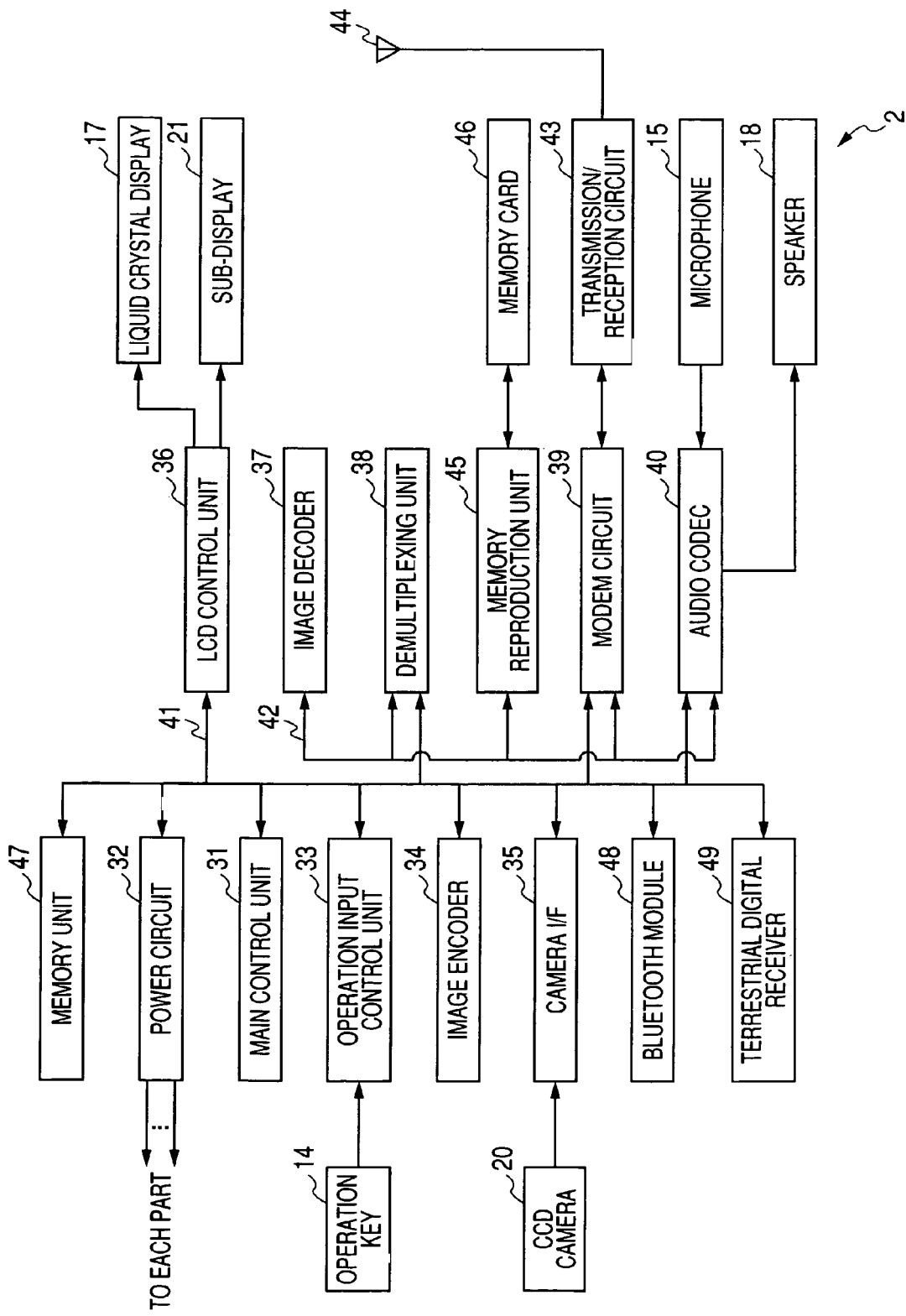
FIG. 4 is a block diagram showing the internal constitution of the mobile telephone device according to the embodiment.

FIG. 4 shows the internal constitution of the mobile telephone device 2 applicable as the information processing apparatus. As shown in FIG. 4, the mobile telephone device 2 is so constituted that: to a main control unit 31 which controls each unit in the first housing 12 and the second housing 13, a power circuit 32, an operation input control unit 33, an image encoder 34, a camera interface 35, an LCD (Liquid Crystal Display) control unit 36, a demultiplexing unit 38, a modem circuit unit 39, an audio codec 40, a memory unit 47, a Bluetooth module 48, and a Terrestrial digital receiver 49 are connected respectively through a main bus 41; and to the main control unit 31, the image encoder 34, an image decoder 37, the demultiplexing unit 38, the modem circuit 39, the audio codec 40, and a memory reproduction unit 45 are connected through a synchronous bus 42.

The main control unit 31 consists of a CPU (Central Processing Unit), a ROM (Read Only Memory), and a RAM (Random Access Memory). The CPU executes various processing in accordance with a program stored in the ROM or various application programs loaded from the memory unit 47 into the RAM, generates various control signals, and supplies the control signal to each unit thereby to control the mobile telephone device 2. The RAM stores appropriately data necessary for the CPU to execute the various processing. The main control unit 31 contains a timer which measures accurately the current date and time.

In the mobile telephone device 2, on the basis of the control by the main control unit 31, the audio signal collected by the microphone 15 in a voice call mode is converted and compressed into a digital audio signal by the audio codec 40, this digital audio signal is subjected to spread spectrum processing in the modem circuit 39, the signal is subjected to digital-to-analog conversion processing and frequency conversion processing in a transmission/reception circuit 43, and thereafter the signal is transmitted through the antenna 44.

Further, in the mobile telephone device 2, the reception signal received by the antenna 44 in the voice call mode is amplified and subjected to frequency conversion processing and analog-to-digital conversion processing, the signal is subjected to reverse spread spectrum processing in the modem circuit 39, expanded by the audio codec 40, converted into an analog audio signal, and thereafter the converted analog audio signal is output through the speaker 18.

The mobile telephone device 2, in case that it transmits an image signal in a data communication mode, supplies the image signal picked up by the CCD camera 20 through the camera interface 35 to the image encoder 34.

The image encoder 34 compresses and encodes the image signal supplied from the CCD camera 20 by a predetermined coding system such as MPEG (Moving Picture Experts Group) 4 thereby to convert the image signal into a coded image signal, and sends the coded image signal to the demultiplexing unit 38. At this time, simultaneously the mobile telephone device 2 sends the voice collected by the microphone 15 while the image is being picked up by the CCD camera 20, as a digital audio signal, to the demultiplexing unit 38 through the audio codec 40.

The demultiplexing unit 38 multiplexes the coded image signal supplied from the image encoder 34 and the audio signal supplied from the audio codec 40 by a predetermined system, subjects a multiplexed signal obtained by the above processing to spread spectrum processing in the modem circuit 39, and to digital-to-analog conversion processing and frequency conversion processing in the transmission/reception circuit 43, and thereafter transmits the signal through the antenna 44.

On the other hand, the mobile telephone device 2 can receive data on a Web page in the data communication mode.

Further, the mobile telephone device 2, in case that it receives data of a moving image file linked to, for example, a Web page in the data communication mode, subjects a reception signal received through the antenna 44 from the base station 3 to reverse spread spectrum processing in the modem circuit 39, and sends a multiplexed signal obtained by the above processing to the demultiplexing unit 38.

The demultiplexing unit 38 separates the multiplexed signal into the coded image signal and the audio signal, supplies the coded image signal through the synchronous bus 42 to the image decoder 37, and supplies the audio signal to the audio codec 40. The image decoder 37 decodes the coded image signal by a decoding system corresponding to the predetermined coding system such as MPEG4 thereby to generate a reproduction moving image signal, and supplies the generated reproduction moving image signal through the LCD control unit 36 to the liquid crystal display 17. Hereby, the moving image data included in the moving image file linked to the Web page is displayed.

At this time, simultaneously the audio codec 40, after converting the audio signal into an analog audio signal, supplies this analog audio signal to the speaker 18. Hereby, the audio signal included in the moving image file linked to the Web page is reproduced.

The memory unit 47 consists of, for example, a flash memory that is a nonvolatile memory of which contents are electrically rewritable and erasable and HD) (Hard Disc Drive), and saves various application programs executed by the CPU of the main control unit 31 and various data groups.

The Bluetooth module 48 is a module which performs wireless communication by Bluetooth (registered trademark), which performs the wireless communication with the headset 9 existing near the mobile telephone device 2.

The terrestrial digital receiver 49 receives terrestrial digital broadcasting and supplies the terrestrial digital broadcasting received from the broadcasting station 8 to the demultiplexing unit 38 or the memory unit 47.

Next, referring to a flowchart in FIG. 5, Bluetooth PICT display control processing in the mobile telephone device 2 in FIG. 4 will be described. By user's operation of the operation key 14, an instruction on start of connection processing to the headset 9 used as the terminal device is accepted, whereby this Bluetooth PICT display control processing is started.

More specifically, in case that the connection procession to the headset 9 is executed, first, the operation key 14 is operated by the user, whereby the Bluetooth function loaded on the mobile telephone device 2 is started. Next, when the decision key of the operation key 14 is operated by the user, a standby screen shifts to a menu screen (both are not shown). When a menu item of the Bluetooth function is selected from the menu displayed on the menu screen, terminal devices which can perform the wireless communication are searched. Thereafter, plural terminal devices which can perform the wireless communication and exist around the mobile telephone device are displayed, from which a terminal device which can execute predetermined service is selected by user's operation of the operation key 14 thereby to start the connection processing with the selected terminal device.

In a step S1, the main control unit 31 controls the LCD control unit 36 in the connection processing with the headset 9 as the selected terminal device, and lets the liquid crystal display 17 display a connection standby PICT 51 which indicates a connectable state from the headset 9 as the terminal device.

In a step S2, the liquid crystal display 17, in accordance with the control by the LCD control unit 36, displays the connection standby PICT 51 as shown in FIG. 6.

In a step S3, the main control unit 31, when the mobile telephone device 2 and the headset 9 as the terminal device are connected by A2DP, generates a client connection request for requesting connection to the headset 9 as the terminal device (client), and supplies the generated client connection request to the Bluetooth module 48.

FIG. 7 shows a sequence of the concrete processing in the CPU of the main control unit 31.

In FIG. 7, a task management unit, an external communication UI (User Interface) unit, an external bearer management unit, a Bluetooth connection processing unit, and a Bluetooth stack indicate functional configurations (tasks) executed by the CPU of the main control unit 31. The task management unit is a task that manages which task displays the screen, and the external communication UI unit is a task that displays a Bluetooth setting menu, device search, and a pairing screen. The external bearer management unit is a task that manages which bearer (an infrared module, a Bluetooth module, a USB which exist outside) the mobile telephone device 2 is being connected to at the present, and the Bluetooth connection processing unit is a task that executes wireless connection processing by the Bluetooth module 48. The Bluetooth stack is concealing protocol portions in packet creation of the Bluetooth and its interpretation under a stack structure.

For example, as shown in FIG. 7, the main control unit 31, when the mobile telephone device 2 and the headset 9 as the terminal device are connected by the A2DP, executes the task by the external communication UI unit, and generates a client connection request for requesting connection to the headset 9 as the terminal device (client).

In a step S4, the main control unit 31 controls the Bluetooth module 48 and lets the Bluetooth module 48 transmit the generated client connection request via the wireless communication to the headset 9. The Bluetooth nodule 48, in accordance with the control of the main control unit 31, transmits the generated client connection request via the wireless communication to the headset 9.

For example, as shown in FIG. 7, the main control unit 31 executes the task by the Bluetooth connection processing unit, and lets the Bluetooth module 48 transmit the generated client connection request to the headset 9.

In a step S5, the Bluetooth module 48 receives a client connection response which is a response to the client connection request transmitted to the headset 9, from the headset 9 via the wireless communication. The Bluetooth module 48 supplies the received client connection response to the main control unit 31.

For example, as shown in FIG. 7, the main control unit 31 executes the task by the Bluetooth connection processing unit, receives through the Bluetooth module 48 the client connection response which is the response to the client connection request transmitted to the headset 9, and acquires the received client connection response. Next, the main control unit 31 executes the task by the Bluetooth connection processing unit, and judges on the basis of the acquired client connection response whether or not the connection between the mobile telephone device 2 and the headset 9 by the A2DP has succeeded. In case that the main control unit 31 judges that the connection between the mobile telephone device 2 and the headset 9 by the A2DP has succeeded, the connection between the mobile telephone device 2 and the headset 9 by the A2DP is established.

In a step S6, the main control unit 31, when the connection between the mobile telephone device 2 and the headset 9 by the A2DP is established, controls the LCD control unit 36, and lets the liquid crystal display 17 display a connection PICT 52 as shown in FIG. 6 indicating a state where the connection with the headset 9 as the terminal device is established.

In a step S7, the liquid crystal display 17, in accordance with the control of the LCD control unit 36, displays the connection PICT 52 as shown in FIG. 6.

In a step S8, the main control unit 31 generates a SCMS-T information acquiring request for requesting acquirement of SCMS-T information indicating whether or not the headset 9 as the terminal device is supporting a predetermined system (for example, SCMS-T) for preventing copy of audio data, and supplies the generated SCMS-T information acquiring request to the Bluetooth module 48.

For example, as shown in FIG. 7, the main control unit 31 executes the task by the Bluetooth connection processing unit, and generates an SCMS-T information acquiring request for requesting acquisition of the SCMS-T information indicating whether or not the headset 9 as the terminal device is supporting a predetermined system (for example, SCMS-T) for preventing copy of audio data.

In a step S9, the main control unit 31 controls the Bluetooth module 48, and lets the Bluetooth module 48 transmit the generated SCMS-T information acquiring request to the headset 9 via the wireless communication. The Bluetooth module 48, in accordance with the control of the main control unit 31, transmits the generated SCMS-T information acquiring request to the headset 9 via the wireless communication.

For example, as shown in FIG. 7, the main control unit 31 executes the task by the Bluetooth connection processing unit, and lets the Bluetooth module 48 transmit the generated client connection request to the headset 9.

Thereafter, the main control unit 3 executes the task by the Bluetooth connection processing unit, generates bearer connection completion notice, sends the generated bearer connection completion notice to the external bearer management unit that is task of managing which bearer the mobile telephone device 2 is being connected to at the present, and notifies, of the client connection response, the external communication UI unit that is the task of displaying the Bluetooth setting menu, the device search, and the pairing screen.

In a step S10, the Bluetooth module 48 receives an SCMS-T information acquiring response that is a response to the SCMS-T information acquiring request transmitted to the headset 9, from the headset 9 via the wireless communication. The Bluetooth module 48 supplies the received SCMS-T information acquiring response to the main control unit 31.

For example, as shown in FIG. 7, the main control unit 31 executes the task by the Bluetooth connection processing unit, receives through the Bluetooth module 48 the SCMS-T information acquiring response that is the response to the SCMS-T information acquiring request transmitted to the headset 9, and acquires the received SCMS-T information acquiring response.

This SCMS information acquiring response includes SCMS-T information indicating whether or not the headset 9 as the terminal device is supporting the predetermined system (for example, SCMS-T) for preventing copy of the audio data.

In a step S11, the main control unit 31, on the basis of the acquired SCMS-T information acquiring response, judges whether or not the headset 9 as the terminal device is supporting the predetermined system (for example, SCMS-T) for preventing copy of the audio data.

Specifically, in case that the mobile telephone device 2 and the headset 9 as the terminal device are connected by the A2DP, in content protection capability in set configuration of AV Distribution Transport Protocol (AVDTP), on the basis of the SCMS-T information acquiring response acquired from the headset 9, the main control unit 31 judges whether or not the headset 9 as the terminal device is supporting the predetermined system (for example, SCMS-T) for preventing copy of the audio data.

In case that the main control unit 31 judges in the step S11 that the headset 9 as the terminal device is supporting the predetermined system (for example, SCMS-T) for preventing copy of the audio data, the main control unit 31 controls the LCD control unit 36 in a step S12, changes the connection PICT 52 displayed in a predetermined position on the liquid crystal display 17 at the present, and lets the liquid crystal display 17 display, for example, an SCMS-T correspondence connection PICT 53 as shown in FIG. 6. The SCMS-T corresponding connection PICT 53 indicates a state where the connection with the headset 9 as the terminal device is established and a fact that the headset 9 is supporting, for example, the SCMS-T (that copy protection is effective).

In a step S13, the liquid crystal display 17, in accordance with the control of the LCD control unit 36, changes the connection PICT 52 displayed in the predetermined position on the liquid crystal display 17 at the present, and displays the SCMS-T correspondence connection PICT 53 as shown in FIG. 6.

Hereby, the user, in case that the mobile telephone device 2 and the headset 9 as the terminal device are connected by the A2DP, can know whether or not the connected headset 9 is supporting the predetermined system (for example, SCMS-T) for preventing copy of the audio data. Accordingly, thereafter, he can know whether or not he can listen, through the headset 9 connected by the A2DP, to the voice (music) on the basis of the audio data of the terrestrial digital broadcasting received through the terrestrial digital receiver 49 in the mobile telephone device 2.

In case that the main control unit 31 judges in the step S11 that the headset 9 as the terminal device is not supporting the predetermined system (for example, SCMS-T) for preventing copy of the audio data, the connection PICT 52 displayed in the predetermined position on the liquid crystal display 17 at the present is not changed, and the SCMS-T correspondence connection PICT 53 is not displayed. Namely, the connection PICT 52 displayed in the predetermined position on the liquid crystal display 17 at the present continues to be displayed. Thereafter, the Bluetooth PICT display control processing ends.

Figure 5:
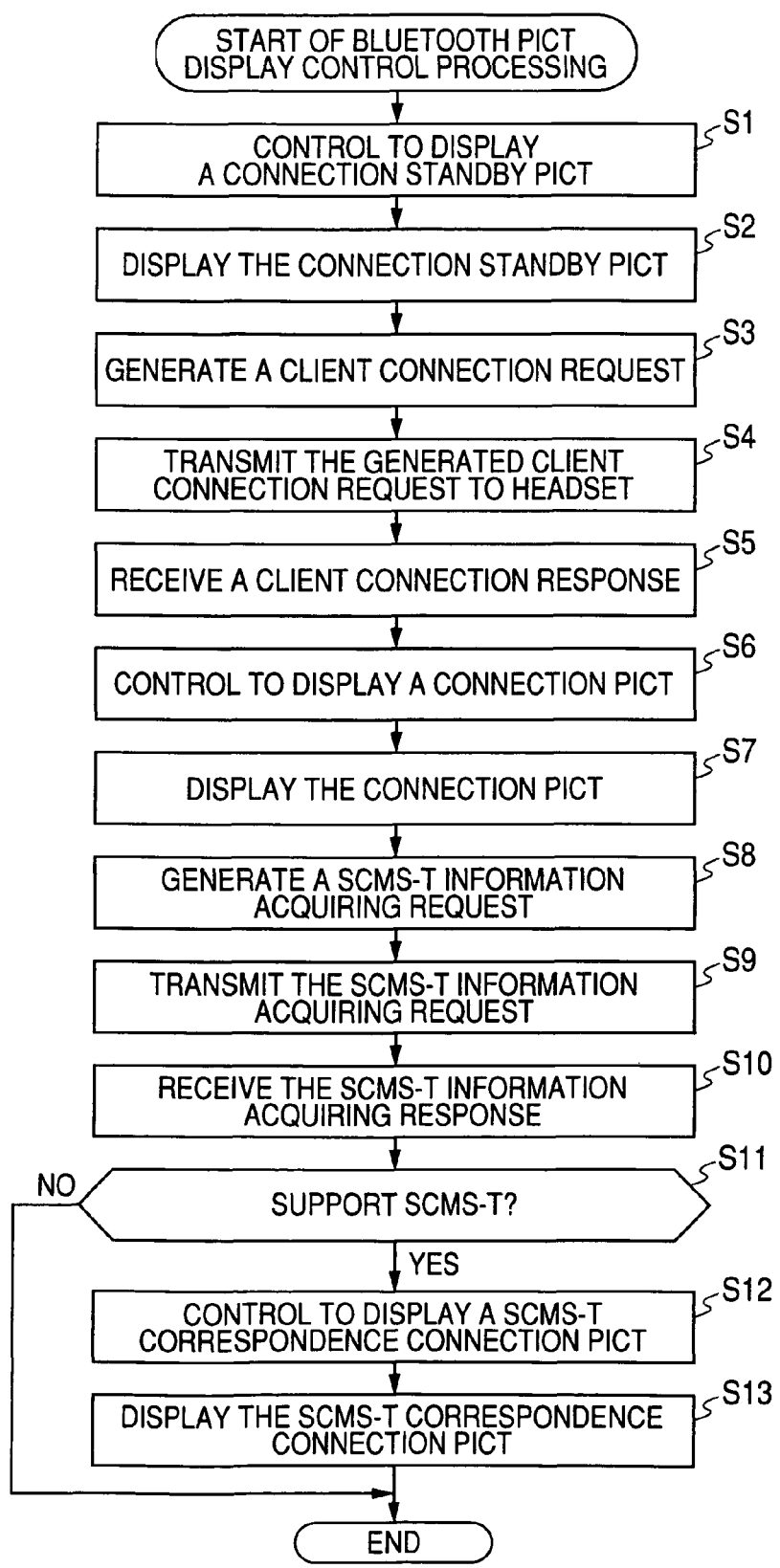
FIG. 5 is a flowchart for explaining Bluetooth PICT display control processing in the mobile telephone device of FIG. 4.

In FIG. 5, the operations in the step S6 and the step S7, and the operations in and after the step S8 may be performed concurrently (independently).

In the embodiment of the invention, for example, in case that the user listens to the voice (music) through the headset 9 on the basis of the audio data of Terrestrial digital broadcasting received from the broadcasting station 8, after the connection with the headset 9 as the terminal device by the A2DP has succeeded and established, the SCMS-T information acquiring request for requesting acquirement of the SCMS-T information indicating whether or not the headset 9 as the terminal device is supporting the predetermined system (for example, SCMS-T) for preventing copy of the audio data is generated, and the generated SCMS-T information acquiring request can be transmitted through the Bluetooth module 48 to the headset 9.

Thereafter, the SCMS-T information acquiring response that is the response to the SCMS-T information acquiring request transmitted to the headset 9 is received, and whether or not the headset 9 as the terminal device is supporting the predetermined system (for example, SCMS-T) for preventing copy of the audio data is judged. In case that it is judged that the headset 9 as the terminal device is supporting the predetermined system (for example, SCMS-T) for preventing copy of the audio data, the main control unit 31 can perform control so that the connection PICT 52 displayed in the predetermined position on the liquid crystal display 17 at the present is changed to the SCMS-T correspondence connection PICT 53 indicating a state where the connection with the headset 9 as the terminal device is established and the fact that the headset 9 is supporting, for example, the SCMS-T (that copy protection is effective) and the PICT 53 is displayed.

Hereby, the user, in case that the mobile telephone device 2 and the headset 9 as the terminal device are connected by the A2DP, can know whether or not the connected headset 9 is supporting the predetermined system (for example, SCMS-T) for preventing copy of the audio data. Accordingly, thereafter, he can know whether or not he can listen, through the headset 9 connected by the APDP, to the voice (music) on the basis of the audio data of the Terrestrial digital broadcasting received from the broadcasting station 8 by the mobile telephone device 2.

In result, the user, when the mobile telephone device 2 and the headset 9 as the terminal device have been connected by, for example, the A2DP, can know that the transmitted audio data is not reproduced by the headset 9 because the terminal device (device) such as the headset is not supporting, for example, the SCMS-T, and he can readily grasp such the condition that the transmitted audio data is not reproduced, on the liquid crystal display 17. As described above, convenience when the audio data is transferred can be improved.

In the embodiment of the invention, the invention is applied to the case where the user listens, through the headset 9, to the voice (music) on the basis of the audio data of the Terrestrial digital broadcasting received from the broadcasting station 8. However, the invention is not limited to such the case, but the invention may be applied also to a case where the audio data previously stored in the memory unit 47 is transferred to the headset 9 as the terminal set by, for example, the A2DP connection by means of the SCMS-T. Namely, the invention can be applied to the case where either audio data is transferred by means of the SCMS-T.

In the Bluetooth PICT display control processing described with reference to the flowchart in FIG. 5, the case where connection processing by the A2DP is performed from the mobile telephone device 2 as a server to the headset 9 as the terminal device (client) has been described. However, the invention may be applied also to a case where connection processing by the A2DP is performed from the terminal device (client) to the mobile telephone device 2 as the server. The Bluetooth PICT display control processing in this case will be described.

With reference to a flowchart in FIG. 8, another Bluetooth PICT display control processing in the mobile telephone device 2 of FIG. 4 will be described. Operations from a step S24 to a step S31 in FIG. 8 are basically similar to those from the step S6 to the step S13 in FIG. 5. Therefore, its description is not repeated but is omitted.

In a step S21, the main control unit 31, upon reception of a permission inquiry request for inquiring permission of connection processing by the A2DP, from the headset 9 as the terminal device (client), generates a permission inquiry response that is a response to the permission inquiry request from the headset 9 as the terminal device (client).

FIG. 9 shows a sequence of the concrete processing in the CPU of the main control unit 31 when the Bluetooth PICT display control processing described with reference to the flowchart in FIG. 8 is executed.

A task management unit, an external communication UI (User Interface) unit, an external bearer management unit, a Bluetooth connection processing unit, and a Bluetooth stack in FIG. 9 are similar to the configuration in FIG. 7. Therefore, their description is not repeated but is omitted.

For example, as shown in FIG. 9, the main control unit 31 executes the task by the Bluetooth connection processing unit, and generates a permission inquiry response that is a response to the permission inquiry request from the headset 9 as the terminal device (client).

In a step S22, the main control unit 31 controls the Bluetooth module 48 and lets the Bluetooth module 48 transmit the generated permission inquiry response to the headset 9 via the wireless communication. The Bluetooth module 48, in accordance with the control of the main control unit 31, transmits the generated permission inquiry response to the headset 9 via the wireless communication.

For example, as shown in FIG. 9, the main control unit 31 executes the task by the Bluetooth connection processing unit, and lets the Bluetooth connection processing unit 48 transmit the generated permission inquiry response to the headset 9.

In a step S23, the Bluetooth module 48 receives a connection notice indicating that the connection with the mobile telephone device 2 by the A2DP has been established, which has been transmitted to the headset 9, from the headset 9 via the wireless communication. The Bluetooth module 48 supplies the received connection notice to the main control unit 31.

For example, as shown in FIG. 9, the main control unit 31 executes the task by the Bluetooth connection processing unit, receives the connection notice indicating that the connection with the mobile telephone device 2 by the A2DP has been established, which has been transmitted to the headset 9, from the headset 9 via the wireless communication, and acquires the received connection notice.

Thereafter, the processing proceeds to a step S24, and operations in and after the step S24 are executed. Namely, an SCMS-T information acquiring request for requesting acquirement of the SCMS-T information indicating whether or not the headset 9 as the terminal device is supporting a predetermined system (for example, SCMS-T) for preventing copy of audio data is generated, the generated SCMS-T information acquiring request is transmitted to the headset 9 through the Bluetooth module 48. Next, on the basis of SCMS-T information included in the received SCMS-T information acquiring response, whether or not the headset 9 as the terminal device is supporting the predetermined system (for example, SCMS-T) for preventing copy of the audio data is judged.

In FIG. 8, the operations in the step S24 and a step 25, and the operations in and after a step S26 may be performed concurrently (independently). The main control unit 31 executes the task by the Bluetooth connection processing unit, generates a bearer connection completion notice, notifies, of the generated bearer connection completion notice, the external bearer management unit that manages which bearer the mobile telephone device 2 is connecting to at the present, and notifies, of the connection notice from the headset 9, the external communication UT unit that is the task of displaying a Bluetooth setting menu, device search, and a pairing screen.

Hereby, in case that the mobile telephone device 2 and the headset 9 as the terminal device (client) are connected by the A2DP, not only when the connection processing by the A2DP is performed from the mobile telephone device 2 as the server to the headset 9 as the terminal device (client) but also when the connection processing by the A2DP is performed from the terminal device (client) to the mobile telephone device 2 as the server, regarding the headset 9 which is supporting the predetermined system (for example, SCMS-T) for preventing the copy of the audio data, the main control unit 31 can perform control so that the connection PICT 52 displayed at the present is changed to a SCMS-T correspondence connection PICT 53 indicating a state where the connection with the headset 9 as the terminal device is established and the fact that the headset 9 is supporting, for example, the SCMS-T (that copy protection is effective) and the PICT 53 is displayed.

After the connection between the mobile telephone device 2 and the headset 9 as the terminal device by the A2DP has been established, in case that the connection by the A2DP is cut from the headset 9, the main control unit 31, upon reception of a disconnection notice from the headset 9, may change the SCMS-T correspondence connection PICT 53 displayed in the predetermined position on the liquid crystal display 17 at the present to the connection PICT 52 or the connection standby PICT 51 and display the changed PICT. Bluetooth PICT display control processing using this method will be described below.

Figure 10:
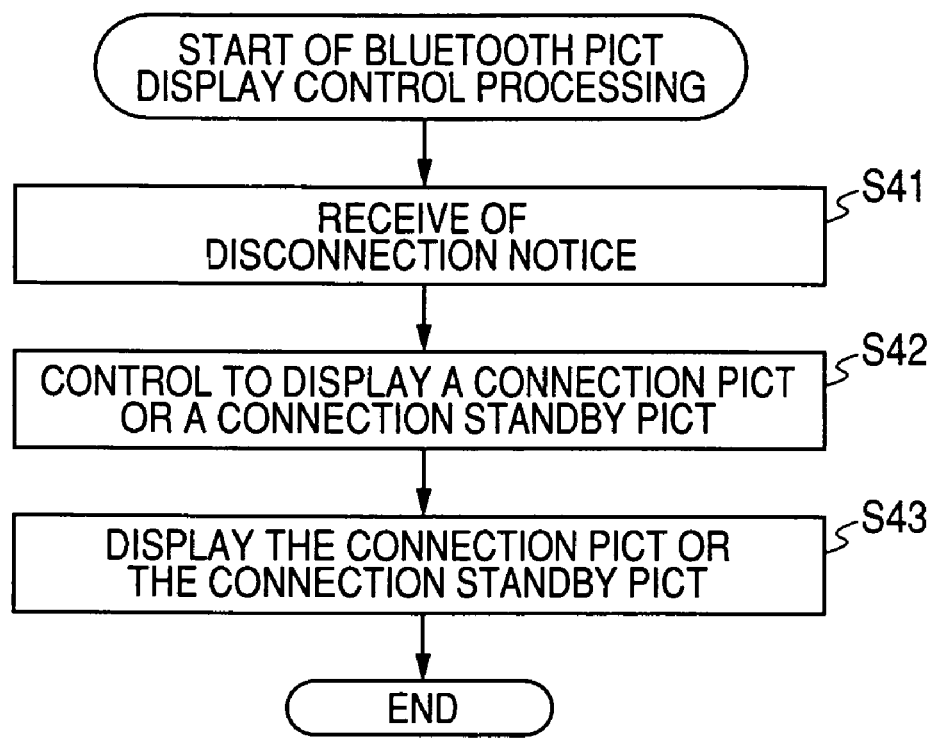
FIG. 10 is a flowchart for explaining another Bluetooth PICT display control processing in the mobile telephone device of FIG. 4.
Figure 11:
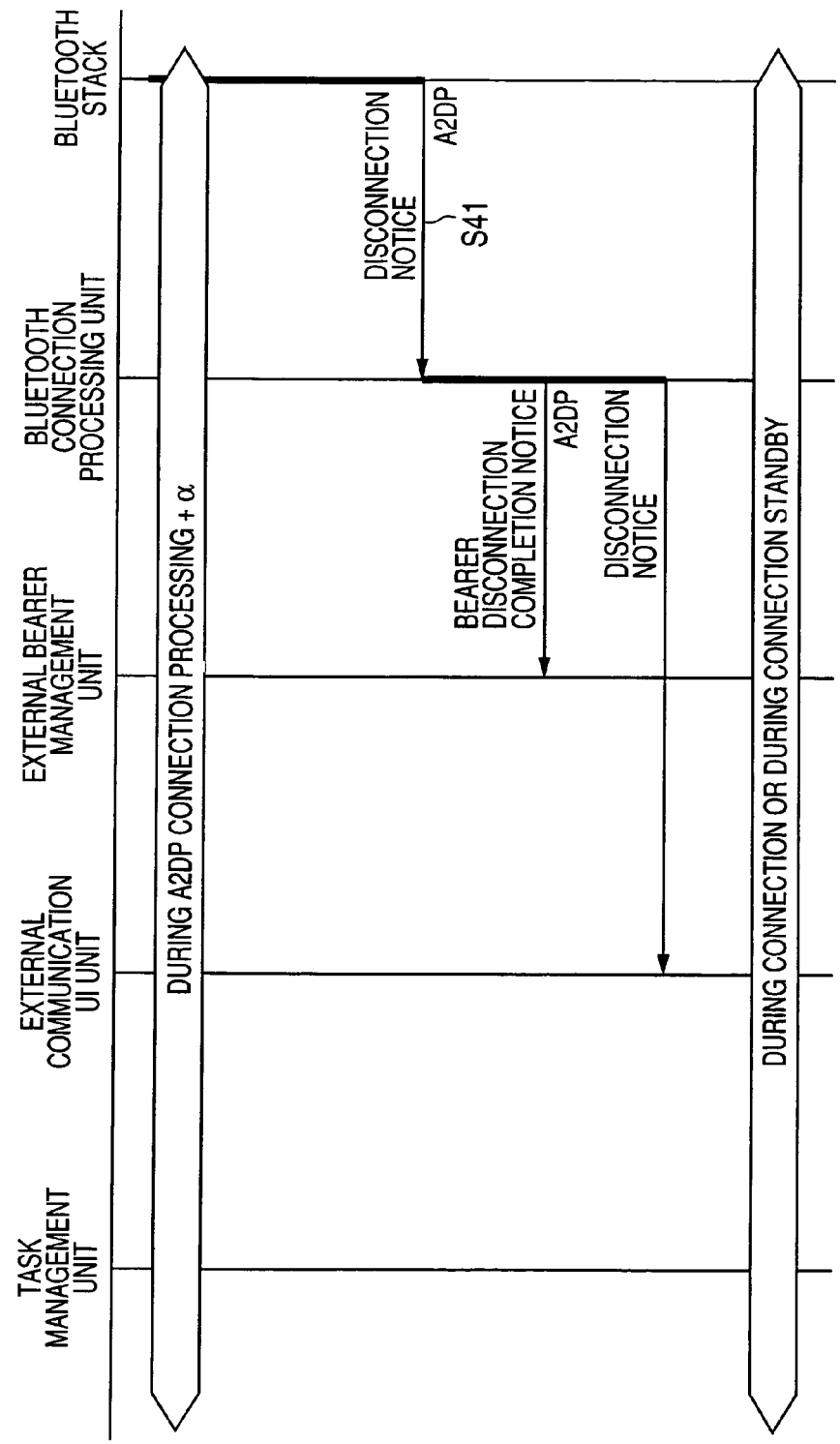
FIG. 11 is a diagram showing a sequence of the concrete processing in CPU of the main control unit when Bluetooth PICT display control processing described with reference to the flowchart in FIG. 10 is executed.

Referring to a flowchart in FIG. 10, another Bluetooth PICT display control processing in the mobile telephone device 2 of FIG. 4 will be described. FIG. 11 shows a sequence of the concrete processing in the CPU of the main control unit 31 when the Bluetooth PICT display control processing described with reference to the flowchart in FIG. 10 is executed.

In a step S41, the Bluetooth module 48 receives a disconnection notice from the headset 9 via the wireless communication. The Bluetooth module 48 supplies the received disconnection notice to the main control unit 31.

For example, as shown in FIG. 11, the main control unit 31 executes the task by the Bluetooth connection processing unit, receives the disconnection notice transmitted from the headset 9 through the Bluetooth module 48, and acquires the received disconnection notice.

Thereafter, in a step S42, the main control unit 31 controls the LCD control unit 36 to change the SCMS-T correspondence connection PICT 53 displayed in the predetermined position on the liquid crystal display 17 at the present. In case that service during connection exists (namely, in case that another profile during connection exists), the main control unit 31 lets the liquid crystal display 17 display the connection PICT 52 as shown in FIG. 6, while in case that service during connection does not exist (namely, in case that another profile during connection does not exist), the main control unit 31 lets the liquid crystal display 17 display the connection standby PICT 51 as shown in FIG. 6.

In a step S43, the liquid crystal display 17, in accordance with the control of the LCD control unit 36, change the SCMS-T correspondence connection PICT 53 displayed in the predetermined position on the liquid crystal display 17 at the present, and displays the connection PICT 52 or the connection standby PICT 51 as shown in FIG. 6.

The main control unit 31 executes the task by the Bluetooth connection processing unit, generates a bearer disconnection completion notice, supplies the generated bearer disconnection completion notice to the external bearer management unit that manages which bearer the mobile telephone device 2 is connecting to, and supplies the disconnection notice from the headset 9 to the external communication UI unit that is the task of displaying a Bluetooth setting menu, device search, and a pairing screen.

After the connection between the mobile telephone device 2 and the headset 9 as the terminal device by the A2DP has been established, the connection by the A2DP may be cut from the mobile telephone device 2. Bluetooth PICT display control processing using this method will be described below.

Figure 12:
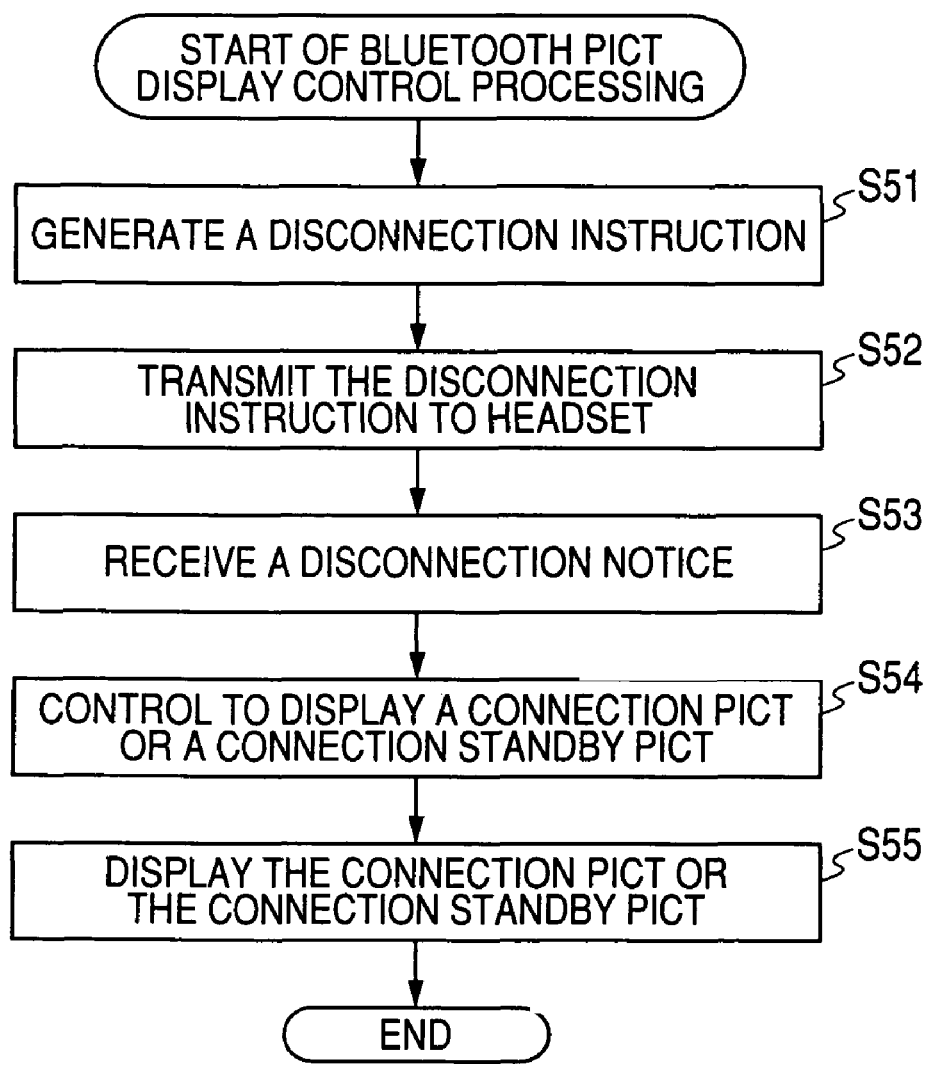
FIG. 12 is a flowchart for explaining another Bluetooth PICT display control processing in the mobile telephone device of FIG. 4.

With reference to a flowchart in FIG. 12, another Bluetooth PICT display control processing in the mobile telephone device 2 of FIG. 4 will be described. Operations from a step S53 to a step S55 in FIG. 12 are similar to those from the step S41 to the step S43 in FIG. 10. Therefore, their description is not repeated but is omitted. Further, FIG. 13 shows a sequence of the concrete processing in the CPU of the main control unit 31 when the Bluetooth PICT display control processing described with reference to the flowchart in FIG. 12 is executed.

In a step S51, the main control unit 31, upon reception of an instruction of disconnection in the Bluetooth setting menu by user's operation of the operation key 14, generates a disconnection instruction which gives an instruction of disconnection to the headset 9 in which the connection by the A2DP has been established.

Figure 13:
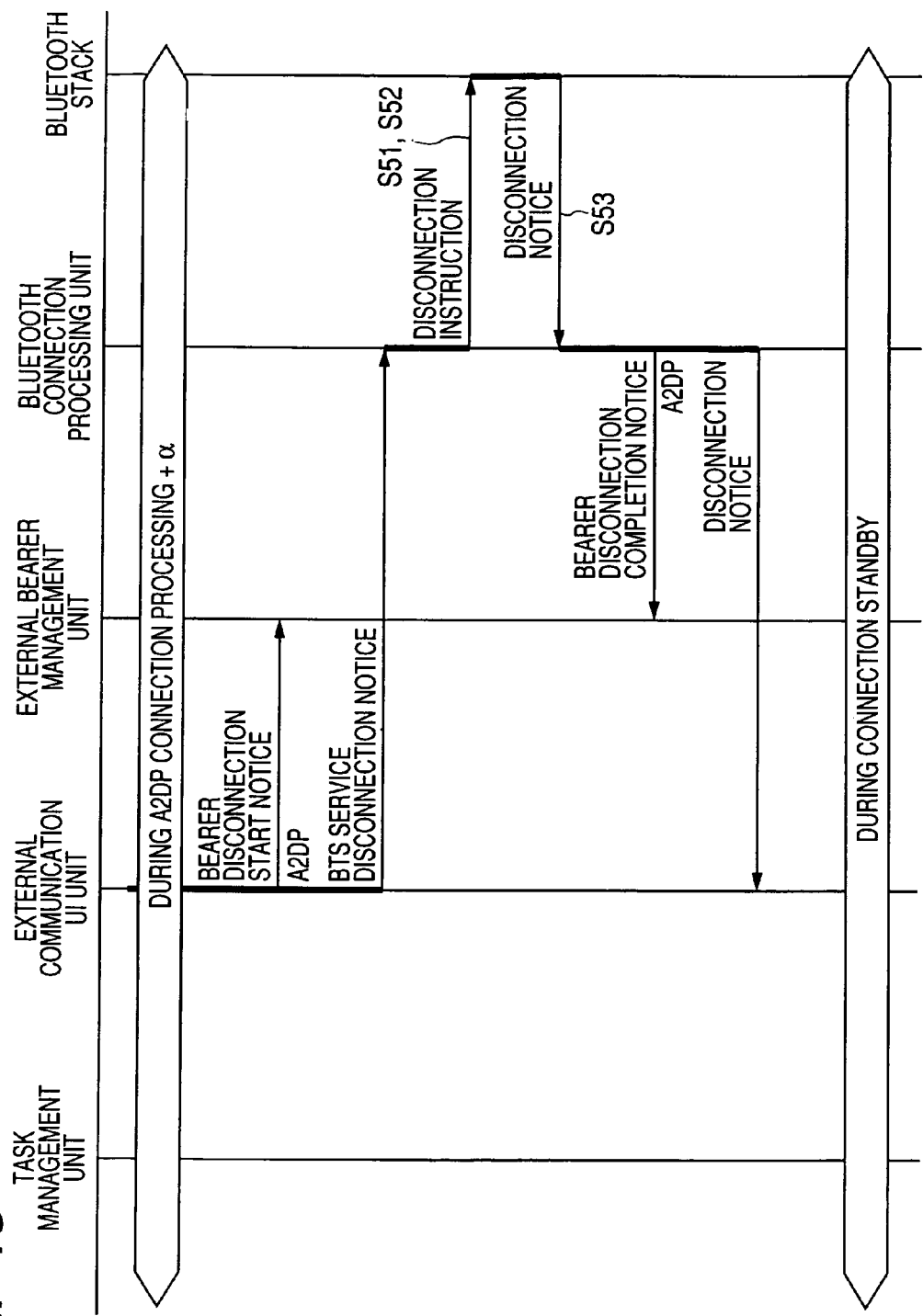
FIG. 13 is a diagram showing a sequence of the concrete processing in CPU of the main control unit when Bluetooth PICT display control processing described with reference to the flowchart in FIG. 12 is executed.

For example, as shown in FIG. 13, the main control unit 31 executes the task by the external communication UI unit, generates a bearer disconnection start notice upon reception of the disconnection instruction in the Bluetooth setting menu by user's operation of the operation key 14, and supplies the generated bearer disconnection start notice to the external bearer management unit that manages which bearer the mobile telephone device 2 is connecting to at the present. Further, the main control unit 31 executes the task by the external communication UI unit, generates a BTS service disconnection notice, and supplies the generated BTS service disconnection notice to the Bluetooth connection processing unit that is the task of executing the wireless connection processing by the Bluetooth module 48.

Next, the main control unit 31 executes the task by the Bluetooth connection processing unit, and generates, on the basis of the BTS service disconnection notice from the external communication UI unit, a disconnection instruction which gives an instruction of disconnection to the headset 9 in which the connection by the A2DP has been established.

In a step S52, the main control unit 31 controls the Bluetooth module 48 and lets the Bluetooth module 48 transmit the generated disconnection instruction to the headset 9 via the wireless communication. The Bluetooth module 48, in accordance with the control of the main control unit 31, transmits the generated disconnection instruction to the headset 9 via the wireless communication.

For example, as shown in FIG. 13, the main control unit 31 executes the task by the Bluetooth connection processing unit, and lets the Bluetooth module 48 transmit the generated disconnection instruction to the headset 9.

Thereafter, processing proceeds to a step S53, and operations in and after the step 53 are executed.

Hereby, after the connection between the mobile telephone device 2 and the headset 9 as the terminal device by the A2DP has been established, in case that the connection by the A2DP cut not only from the headset 9 but also from the mobile telephone device 2, the main control unit 31 can perform control so as to change the SCMS-T correspondence connection PICT 53 displayed in the predetermined position on the liquid crystal display 17 at the present. In case that service during connection exists (namely, in case that another profile during connection exists), the main control unit 31 lets the liquid crystal display 17 display the connection PICT 52; and in case that the service during connection does not exist (namely, in case that another profile during connection does not exist), the main control unit 31 lets the liquid crystal display 17 display the connection standby PICT 51.

In case that the mobile telephone 2 and the headset 9 as the terminal device are connected by A2DP, the increase in distance between the headset 9 and the mobile telephone device 2 causes link loss in which the connection with the headset 9 is in a loss state. Therefore, in such the case, the SCMS-T correspondence connection PICT 53 displayed in the predetermined position on the liquid crystal display 17 at the present may be changed to, for example, a link loss PICT 54 as shown in FIG. 6 indicating occurrence of the link loss in which the connection with the headset 9 is in the loss state. Bluetooth PICT display control processing using this method will be described below.

With reference to a flowchart in FIG. 14, another Bluetooth PICT display control processing in the mobile telephone device 2 of FIG. 4 will be described. FIG. 15 shows a sequence of the concrete processing in the CPU of the main control unit 31 when the Bluetooth PICT display control processing described with reference to the flowchart in FIG. 14 is executed.

In a step S61, the Bluetooth module 48 receives a link loss disconnection notice from the headset 9 via the wireless communication. The Bluetooth module 48 supplies the received link loss disconnection notice to the main control unit 31.

For example, as shown in FIG. 15, the main control unit 31 executes the task by the Bluetooth connection processing unit, receives the link loss disconnection notice transmitted from the headset 9 through the Bluetooth module 48, and acquires the received link loss disconnection notice.

In a step S62, the main control unit 31, upon acquirement of the link loss disconnection notice transmitted from the headset 9, controls the LCD control unit 36 to change the SCMS-T correspondence connection PICT 53 displayed in the predetermined position on the liquid crystal display 17 at the present, and lets the liquid crystal display 17 display, for example a link loss PICT 54 as shown in FIG. 6 indicating occurrence of the link loss in which the connection with the headset 9 is in the loss state. In a step S63, the liquid crystal display 17, in accordance with the control of he LCD control pat 36, changes the SCMS-T correspondence connection PICT 53 displayed in the predetermined position on the liquid crystal display 17, and displays the link loss PICT 54 as shown in FIG. 6.

Hereby, the user can know that: though the connection by the A2DP is performed between the mobile telephone device 2 and the headset 9 as the terminal device at the present, the link loss in which the connection with headset 9 is in the loss state is caused at the present because of the increase in the distance between the headset 9 and the mobile telephone device 2.

Accordingly, convenience in transfer of the audio data can be more improved.

Further, in case that the caused link loss has been recovered, the main control unit 31, upon reception of the permission inquiry request transmitted from the headset 9 existing near the mobile telephone device 2, may generate again an SCMS-T information acquiring request for requesting acquirement of the SCMS-T information indicating whether or not the headset 9 as the terminal device is supporting the predetermined system (for example, SCMS-T) for preventing copy of audio data, supply the generated SCMS-T information acquiring request to the headset 9 through the Bluetooth module 48, and judge, on the basis of SCMS-T information included in the received SCMS-T information acquiring response, whether or not the headset 9 as the terminal device is supporting the predetermined system (for example, SCMS-T) for preventing copy of the audio data.

Figure 16:
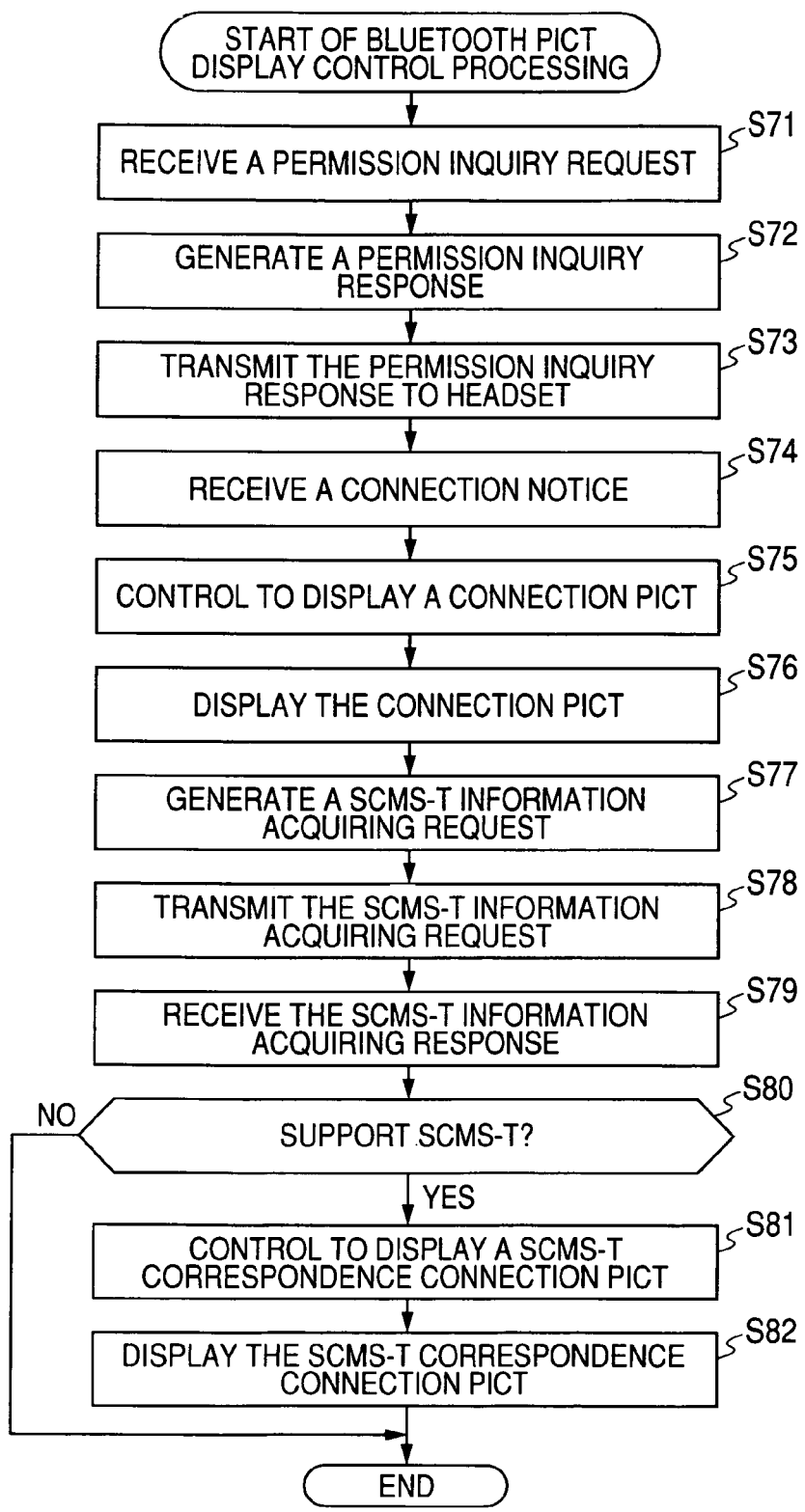
FIG. 16 is a flowchart for explaining another Bluetooth PICT display control processing in the mobile telephone device of FIG. 4.
Figure 17:
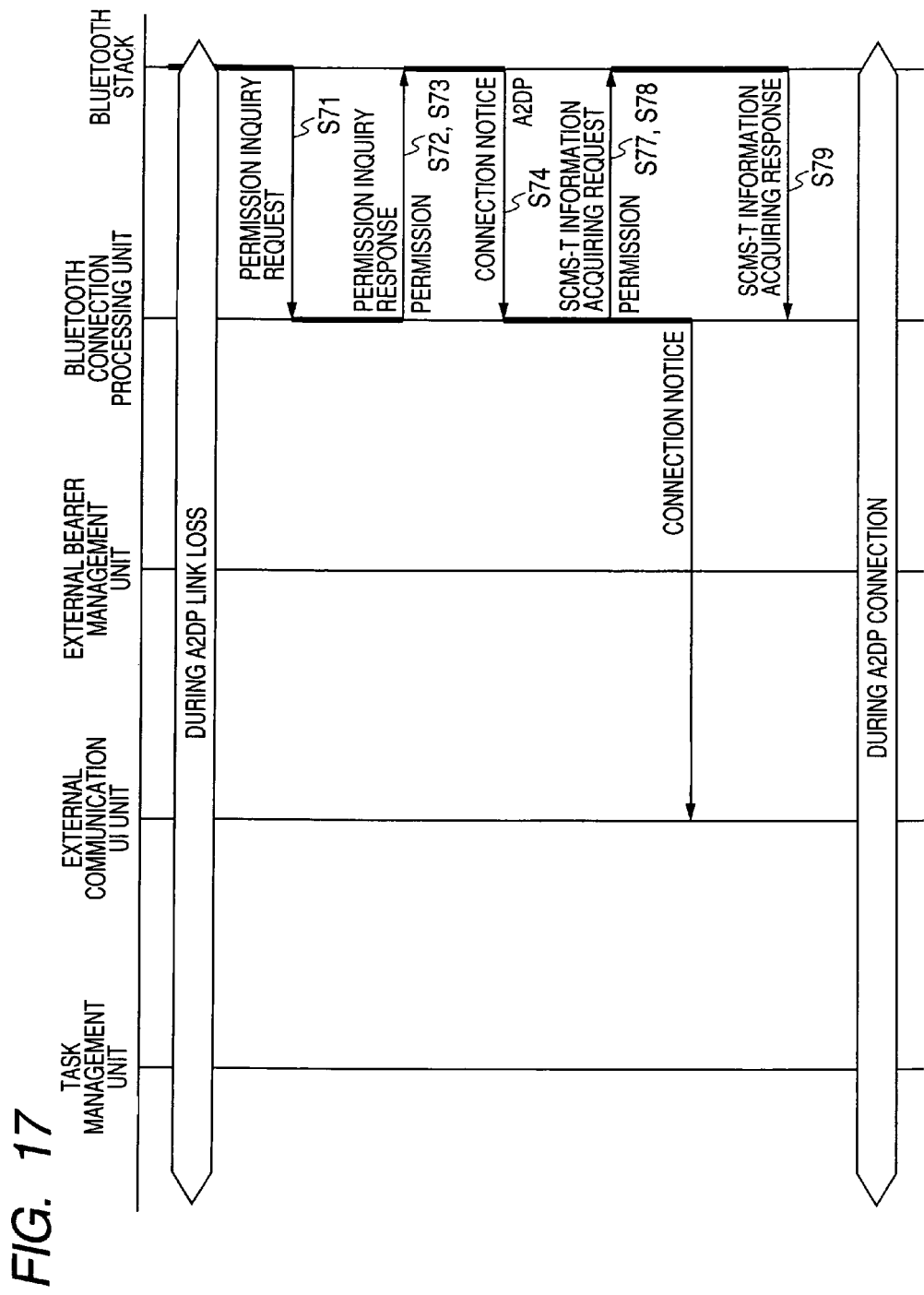
FIG. 17 is a diagram showing a sequence of the concrete processing in CPU of the main control unit when Bluetooth PICT display control processing described with reference to the flowchart in FIG. 16 is executed.

FIG. 16 shows a flowchart of Bluetooth PICT display control processing in this case. FIG. 17 shows a sequence of the concrete processing in the CPU of the main control unit 31 when the Bluetooth PICT display control processing described with reference to the flowchart in FIG. 16 is executed.

Operations from a step S72 to a step S82 in FIG. 16 are similar to those from the step S21 to the step S31 in FIG. 8. Therefore, their description is not repeated but is omitted.

In a step S71, the Bluetooth module 48 receives a permission inquiry request (a permission inquiry request for inquiring the permission of connection processing by the A2DP) from the headset 9 via the wireless communication. The Bluetooth module 48 supplies the received permission inquiry request to the main control unit 31.

For example, as shown in FIG. 17, the main control unit 31 executes the task by the Bluetooth connection processing unit, receives the permission inquiry request transmitted from the headset 9 through the Bluetooth module 48, and acquires the received permission inquiry request. Thereafter, the processing proceeds to a step S72 and operations in and after the step S72 are executed.

When the main control unit 31 receives a connection notice from the headset 9, the link loss PICT 54 is changed to the connection PICT 52 by processing in steps S75 and S76, and the connection PLCT 52 is displayed. Further, because of the recovering time from the link loss, the main control unit 31 does not generate a bearer connection completion notice. Accordingly, the bearer connection completion notice is not supplied to the external bearer management unit that is the task of managing which bearer the mobile telephone device 2 is being connected to.

Hereby, even in case that the link loss occurs, when the link loss is thereafter recovered, the main control unit 31 generates again the SCMS-T information acquiring request for requesting acquirement of the SCMS-T information indicating whether or not the headset 9 as the terminal device is supporting the predetermined system (for example, SCMS-T) for preventing copy of audio data, transmits the generated SCMS-T information acquiring request to the headset 9 through the Bluetooth module 48, and can judge, on the basis of SCMS-T information included in the received SCMS-T information acquiring response, whether or not the headset 9 as the terminal device is supporting the predetermined system (for example, SCMS-T) for preventing copy of the audio data. Further, the main control unit 31 can perform the control so that the ink loss PICT 54 displayed in the predetermined position on the liquid crystal display 17 at the present is changed through the connection PICT 52 to the SCMS-T correspondence connection PICT 53 indicating a state where the connector with the headset 9 as the terminal device is established and the fact that the headset 9 is supporting, for example, the SCMS-T (that copy protection is effective) and the PICT 53 is displayed. Accordingly, convenience in the audio data transferring time can be more improved.

In the Bluetooth PICT display control processing described with reference to the flowchart in FIG. 16, the main control unit 31 receives and acquires SCMS-T information again from the headset 9. However, the already-acquired SCMS-T information may be registered in a data base of each terminal device to judge, on the basis of the registered SCMS-T information, whether or not the headset 9 as the terminal device is supporting the SCMS-T.

In the embodiment of the invention, in case that the Bluetooth is used, the setting-On state (regular standby state) of the Bluetooth, the state during establishment of connection (link) thereof, the state where the connection with the headset 9 as the terminal deice is established and the headset 9 is supporting, for example, the SCMS-T (the copy protection is effective), and the state during the link loss are displayed respectively with the connection standby PICT 51 to the link loss PICT 54, whereby each state is notified of the user. However, the invention is not limited to such the case, but each state may be notified by means of an icon. Here, the connection standby PICT 51 to the link loss PICT 54 are defined as "indication information" indicating each state in connection of the wireless communication with the headset 9 as the terminal device.

Further, the invention can be applied also to information processing devices others than the mobile telephone device 2, for example, a PDA (Personal Digital Assistant), a personal computer, a portable game unit, a portable music player, and a portable moving picture reproducing device.

Further, in the embodiment of the invention, though the invention is applied to the case of the use of the SCMS-T in the connecting time by the A2DP, it is not limited to such the case but may be applied to the case of the use of other copy protection systems than the SCMS-T.

Further, a series of processing described in the embodiment of the invention can be executed by software or hardware.

According to the above-mentioned embodiments, it is possible to improve convenience when audio data is transferred.

Further, in the embodiment of the invention, though the operations in the steps in each flowchart are performed in order of the description and in time series, they do not need necessarily to be performed in time series, and they include operations executed concurrently or individually.

[FIG. 1]
  1 Network system
  4 Public network
  6 Network
  7 Broadcasting contents server
  8 Broadcasting station
  a terrestrial digital broadcasting
[FIG. 4]
  a To each part
  14 Operation key
  47 Memory unit
  32 Power circuit
  31 Main control unit
  33 Operation input control unit
  34 Image encoder
  35 Camera I/F
  46 Bluetooth module
  49 terrestrial digital receiver
  36 LCD control unit
  37 Image decoder
  38 Demultiplexing unit
  45 Memory reproduction unit
  39 Modem circuit
  40 Audio codec
  17 Liquid crystal display
  21 Sub-display
  46 Memory card
  43 Transmission/reception circuit
  15 Microphone
  18 Speaker
[FIG. 5]
  a: Start of Bluetooth PICT display control processing
  S1: Control to display a connection standby PICT
  S2: Display the connection standby PICT
  S3: Generate a client connection request
  S4: Transmit the generated client connection request to headset
  S5: Receive a client connecticn response
  S6: Controll to display a connection PICT
  S7: Display the connection PICT
  S8: Generate a SCMS-T information acquirinq request
  S9: Transmit the SCMS-T information acquirinq request
  S10: Receive the SCMS-T information acquiring response
  S11: Support SCMS-T?
  S12: Control to display a SCMS-T correspondence connection PICT
  S13: Display the SCMS-T correspondence connection PICT
  b: End
[FIG. 6]
  a. Bluetooth PICT
  b. Connection standby PICT
  c. Display in Bluetooth-connectable state with opposite device
  d. Connection PICT
  e. Display in state where connection with opposite device is established
  f. SCM5-T connection PICT
  g. Display in state where connection with opposite device is established and copy protection of opposite device is effective
  h. Link loss PICT
  i. Display in state where connection with opposite device is loss
  j. Automatic connection if there is connection from opposite device during link loss
[FIG. 7]
  a: Task management unit
  b: External communication UI unit
  c: External bearer management unit
  d: Bluetooth connection processing unit
  e: Bluetooth stack
  f: During client connection processing
  g: Client connection request
  i: Client connection response success
  j: SCMS-T information acquiring request
  k: Bearer connection completion notice
  l: Client connection response
  m: SCMS-T information acquiring response
  n: During A2DP connection
[FIG. 8]
  a: Start of Bluetooth PICT display control processing
  S21: Generate a permission inquiry response
  S22: Transmit the permission inquiry response to headset
  S23: Receive a connection notice
  S24: Control to display the connection PICT
  S25: Display the connection PICT
  S26: Generate a SCMS-T information acquiring request
  527: Transmit the SCMS-T information acquiring request
  S28: Receive a SCMS-T information acquiring response
  S29: Support SCMS-T?
  S30: Control to display a SCMS-T correspondence connection PICT
  S31: Display the SCMS-T correspondence connection PICT
  b: End
[FIG 9]
  a. Task management unit
  b. External communication UI unit
  c. External bearer management unit
  d. Bluetooth connection processing unit
  e. Bluetooth stack
  f. During server connection processing
  g. Permission inquiry response
  h. Permission
  i. Connection notice
  j. SCMS-T information acquiring request
  k. Bearer connection completion notice
  l. SCMS-T information acquiring response
  m. During A2DP connection
[FIG. 10]
  a: Start of Bluetooth PICT display control processing
  S41: Receive of disconnection notice
  S42: Control to dispiay a connection PICT or a connection standby PICT S43: Display the connection PICT or the connection standby PICT
b. End

[FIG. 11]
a. Task management unit
b. External communication UI unit
c. External bearer management unit
d. Bluetooth connection processing unit
e. Bluetooth stack
f. During A2DP connection processing+α
g. Disconnection notice
h. Bearer disconnection completion notice
i. During connection or during connection standby

[FIG. 12]
a: Start of Bluetooth PICT display control processing
S51: Generate a disconnection instruction
S52: Transmit the disconnection instruction to headset
S53: Receive a disconnection notice
S54: Control to display a connection PICT or a connection standby PICT
S55: Display the connection PICT or the connection standby PICT
b: End

[FIG. 13]
a. Task management unit
b. External communication UI unit
c. External bearer management unit
d. Bluetooth connection processing unit
e. Bluetooth stack
f. During A2DP connection processing+α
g. Bearer disconnection start notice
h. BTS service disconnection notice
i. Disconnection instruction
j. Disconnection notice
k. Bearer disconnection completion notice
l. During connection standby

[FIG. 14]
a. Start of Bluetooth PICT display control processing
S61: Receive a link loss disconnection notice
S62: Control to display a link loss PICT
S63: Display the link loss PICT
b. End

[FIG. 15]
a. Task management unit
b. External communication UI unit
c. External bearer management, unit
d. Bluetooth connection processing unit
e. Bluetooth stack
f. During A2DP connection processing+α
g. Link loss disconnection notice
h. During link loss

[FIG. 16]
a. Start of Bluetooth PICT display control processing
571: Receive a permission inquiry request
S72: Generate a permission inquiry response
S73: Transmit the permission inquiry response to headset
S74: Receive a connection notice
S75: Control to display a connection PICT
S76: Display the connection PICT
S77: Generate a SCMS-T information acquiring request
S78: Transmit the SCMS-T information acquiring request
S79: Receive the SCMS-T information acquiring response
S80: Support SCMS-T?
S81: Control to display a SCMS-T correspondence connection PICT
S82: Display the SCMS-T correspondence connection PICT
b. End

[FIG. 17]
a. Task management unit
b. External communication UI unit
c. External bearer management unit
d. Bluetooth connection processing unit
e. Bluetooth stack
f. During A2DP link loss
g. Permission inquiry request
h. Permission inquiry response
i. Connection notice
j. SCMS-T information acquiring request
k. SCMS-T information acquiring response
l. During A2DP connection
m. Permission

What is claimed is:

1. An information processing apparatus comprising:
a transmission unit configured to transmit an information acquiring request which acquires information indicating whether or not a predetermined standard for copy protection of audio data is supported by a terminal device to which the audio data is transferred;
a judgment unit configured to judge whether or not the terminal device supports the predetermined standard, based on the information included in an information acquiring response to the information acquiring request from the terminal device;
a display unit configured to display an icon indicating that the information processing apparatus is connected to the terminal device via wireless communication; and
a control unit to control display of the icon to indicate whether or not the predetermined standard is supported, based on a judgment result by the judgment unit,
wherein if the judgment unit judges that the terminal device supports the predetermined standard, the control unit changes the display of the icon so as to indicate a connecting state in which the information processing apparatus is connected to the terminal device and to indicate that the terminal device supports the predetermined standard.

2. The information processing apparatus according to claim 1, wherein the transmission unit transmits the information acquiring request when connection processing is started from the information processing apparatus to the terminal device.

3. The information processing apparatus according to claim 1, wherein the transmission unit transmits the information acquiring request when connecting processing is started from the terminal device to the information processing apparatus.

4. The information processing apparatus according to claim 1, wherein the transmission unit transmits the information acquiring request when a link loss is recovered.

5. The information processing apparatus according to claim 1, wherein when link loss occurs in the wireless communication, the control unit changes the display of the icon so as to indicate that the link loss has occurred.

6. The information processing apparatus according to claim 1, wherein if the judgment unit judges that the terminal device does not support the predetermined standard, the control unit continues the display of the icon so as to indicate that the information processing apparatus is connected to the terminal device via the wireless communication.

7. The information processing apparatus according to claim 1, wherein the predetermined standard for preventing copying of audio data is Serial Copy Management System-T.

8. An information processing method for an information processing apparatus, said method comprising:
- transmitting an information acquiring request which acquires information indicating whether or not a predetermined standard for copy protection of audio data is supported by a terminal device to which the audio data is transferred;
- determining whether or not the terminal device supports the predetermined standard based on the information acquired from the terminal device;
- displaying an icon indicating that the terminal device is connected via wireless communication; and
- controlling display of the icon to indicate whether or not the predetermined standard is supported, based on a determination result as to whether or not the terminal device supports the predetermined standard;
- wherein if it is judged that the terminal device supports the predetermined standard, the display of the icon is changed to indicate a connecting state in which the information processing apparatus is connected to the terminal device and to indicate that the terminal device supports the predetermined standard.

9. A non-transitory computer readable storage medium having a program stored thereon to control an information processing apparatus to perform a process comprising:
- transmitting an information acquiring request which acquires information indicating whether or not a predetermined standard for copy protection of audio data is supported by a terminal device to which the audio data is transferred;
- determining whether or not the terminal device supports the predetermined standard based on the information acquired from the terminal device;
- displaying an icon indicating that the terminal device is connected via wireless communication; and
- controlling display of the icon to indicate whether or not the predetermined standard is supported, based on a determination result as to whether or not the terminal device supports the predetermined standard;
- wherein if it is judged that the terminal device supports the predetermined standard, the display of the icon is changed to indicate a connecting state in which the information processing apparatus is connected to the terminal device and to indicate that the terminal device supports the predetermined standard.

* * * * *